US006183259B1

(12) United States Patent
Macri et al.

(10) Patent No.: US 6,183,259 B1
(45) Date of Patent: *Feb. 6, 2001

(54) SIMULATED TRAINING METHOD USING PROCESSING SYSTEM IMAGES, IDIOSYNCRATICALLY CONTROLLED IN A SIMULATED ENVIRONMENT

(75) Inventors: Vincent J. Macri, 5 Timber Brook La., Durham, NH (US) 03824; Paul Zilber, Plainview, NY (US)

(73) Assignee: Vincent J. Macri, Durham, NH (US)

( * ) Notice: Under 35 U.S.C. 154(b), the term of this patent shall be extended for 0 days.

This patent is subject to a terminal disclaimer.

(21) Appl. No.: 09/184,433

(22) Filed: Nov. 2, 1998

Related U.S. Application Data

(63) Continuation of application No. 08/684,435, filed on Jul. 19, 1996, now Pat. No. 5,890,906, which is a continuation-in-part of application No. 08/375,616, filed on Jan. 20, 1995, now abandoned, which is a continuation-in-part of application No. PCT/US96/00919, filed on Jan. 22, 1996, now abandoned.

(51) Int. Cl.[7] ............................... A63B 9/00; G09B 9/00; G09B 19/00
(52) U.S. Cl. ..................... 434/247; 434/307 R; 434/365; 482/902; 463/3; 463/4; 345/113; 345/156
(58) Field of Search .................................... 434/118, 247, 434/248, 251, 252, 307 R, 308, 365; 482/900–902; 345/112–114, 152, 156, 302, 473, 161, 163, 167, 173; 348/25, 61, 172, 578; 700/90–93; 463/3, 4, 31, 35; 473/43, 152, 438, 446, 447, 453, 461, 266, 422; 273/317.1

(56) References Cited

U.S. PATENT DOCUMENTS

| 2,153,384 | 4/1939 | Mazza . |
| 3,408,750 | 11/1968 | McCollough et al. . |
| 3,729,837 | 5/1973 | Tarnopolsky et al. . |
| 3,898,438 | 8/1975 | Nater et al. . |
| 4,003,140 | 1/1977 | Valentine . |
| 4,021,651 | 5/1977 | Mitsuhashi et al. . |
| 4,085,540 | 4/1978 | Jernstrom et al. . |
| 4,179,704 | 12/1979 | Moore et al. . |
| 4,304,406 | 12/1981 | Cromarty . |
| 4,324,401 | 4/1982 | Stubben et al. . |
| 4,337,049 | 6/1982 | Connelly . |
| 4,600,919 | 7/1986 | Stern . |
| 4,615,526 | 10/1986 | Yasuda et al. . |

(List continued on next page.)

FOREIGN PATENT DOCUMENTS

| WO90/04848 | 5/1990 | (WO) . |
| WO 92/21412 | 12/1992 | (WO) . |
| PCT/US96/00919 | 1/1996 | (WO) . |
| WO 96/01138 | 1/1996 | (WO) . |

OTHER PUBLICATIONS

Okui et al., "Locus Display of Moving Sports Players," SMPTE J., 96(7):667–673 (Jul. 1987).

(List continued on next page.)

Primary Examiner—Joe H. Cheng

(57) ABSTRACT

The present invention pertains to a method and apparatus for simulated training in physical movement using processing system images. Said images may be demonstrative images representing examples of any physical movement, user images that are idiosyncratically controlled by individual users, and/or any combination or separate display of both such images. Simulated training is directed to the personal, interactive control of displayed user controllable images such that the user acquires a level of know-how related to the physical movement of any particular image. Embodiments of the invention could include the physical movement of animals, bacteria, viruses, objects, living, mechanical and electromechanical or other systems and images from live video taping, or animated or computer generated images or live or robots real time images from any other source.

85 Claims, 36 Drawing Sheets

U.S. PATENT DOCUMENTS

| | | |
|---|---|---|
| 4,688,792 | 8/1987 | Rivkin . |
| 4,734,038 | 3/1988 | Dennis . |
| 4,752,764 | 6/1988 | Peterson et al. . |
| 4,805,631 | 2/1989 | Roi du Maroc, II . |
| 4,828,500 | 5/1989 | Seidel et al. . |
| 4,891,748 | 1/1990 | Mann . |
| 4,941,660 | 7/1990 | Winn et al. . |
| 4,984,986 | 1/1991 | Vohnout . |
| 5,100,138 | 3/1992 | Wilde . |
| 5,118,112 | 6/1992 | Bregman et al. . |
| 5,184,295 | 2/1993 | Mann . |
| 5,224,710 | 7/1993 | Feokhari . |
| 5,249,967 | 10/1993 | O'Leary et al. . |
| 5,286,202 | 2/1994 | deGyarfas et al. . |
| 5,312,109 | 5/1994 | Cagle . |
| 5,320,538 | 6/1994 | Baum . |
| 5,344,323 | 9/1994 | Burns . |
| 5,363,297 | 11/1994 | Larson et al. . |
| 5,419,562 | 5/1995 | Cromarty . |
| 5,443,260 | 8/1995 | Stewart et al. . |
| 5,454,722 | 10/1995 | Holland et al. . |
| 5,486,001 | 1/1996 | Baker . |
| 5,513,991 | 5/1996 | Reynolds et al. . |
| 5,554,033 * | 9/1996 | Bizzi et al. ............................ 434/247 |
| 5,562,572 * | 10/1996 | Carmein ............................ 434/247 X |
| 5,577,981 * | 11/1996 | Jarvik ................................ 434/247 X |
| 5,597,309 | 1/1997 | Riess . |
| 5,625,577 | 4/1997 | Kunii et al. . |
| 5,659,764 | 8/1997 | Sakiyama et al. . |
| 5,694,340 | 12/1997 | Kim . |
| 5,724,987 | 3/1998 | Gevins et al. . |
| 5,736,986 | 4/1998 | Sever, Jr. . |
| 5,740,802 | 4/1998 | Nafis et al. . |
| 5,743,744 | 4/1998 | Cassily et al. . |
| 5,797,805 | 8/1998 | Lubell et al. . |
| 5,800,178 | 9/1998 | Gillio . |
| 5,800,179 | 9/1998 | Bailey . |
| 5,803,745 | 9/1998 | Kozak et al. . |
| 5,810,747 | 9/1998 | Brudny et al. . |
| 5,813,864 | 9/1998 | Ikuta . |
| 5,823,786 | 10/1998 | Easterbrook . |
| 5,857,855 * | 1/1999 | Katayama ......................... 473/266 X |
| 5,882,204 * | 3/1999 | Iannazo et al. ................... 473/422 X |

OTHER PUBLICATIONS

International Search Report, PCT/US96/00919 dated Aug. 6, 1996.

Alciatore et al, "Matrix Solution of Digitized Planar Human Body Dynamics For Biomechanics Laboratory Instruction," 1992, Computers In Engineering, vol. 2, pp. 271–276.

Fauvet et al, "Human Movement Analysis With Image Processing In Real Time," 1990, SPIE vol. 1358, pp. 620–630.

Morasso et al, "Kinesis: A Model–Driven Approach To Human Motion Analysis," 1990, SPIE vol. 1395, pp. 775–780.

Baca, A. "Application of Image Processing to Human Motion Analysis" SPIE, vol. 1135, pp. 153–156, 1989.

Rab, G.T. "Application of Three–Dimensional Videography To Human Motion Studies: constraints, assumptions and mathematics," SPIE, vol. 832, 1987, pp. 31–34.

Burnie et al, "Microcomputing In Motion Analysis," Journal of Microcomputer Applications, (1987) 10, 113–117.

Rong et al, "Human Body Motion Image Analysis System" IEEE, 11th International Conference, 1953.

Kepple et al, "The Presentation and Evaluation of a Video Based Six–Degree–of–Freedom Approach For Analyzing Human Motion," IEEE 10th Annual Conference, 1988.

Andriacchi, T.P. "Clinical Applications of the SelSpot System" AMD (Symposia Series) ASME, 1987, pp. 339–342.

DeLuzio et al, "A Procedure To Validate Three–Dimensional Motion Assessment Systems," J. Biomechanics, vol. 26 No. 6, pp. 753–759, 1992.

* cited by examiner

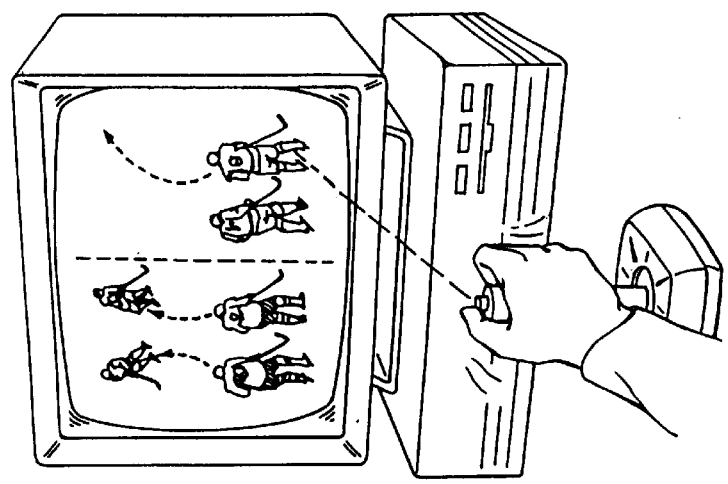
FIG. 5B
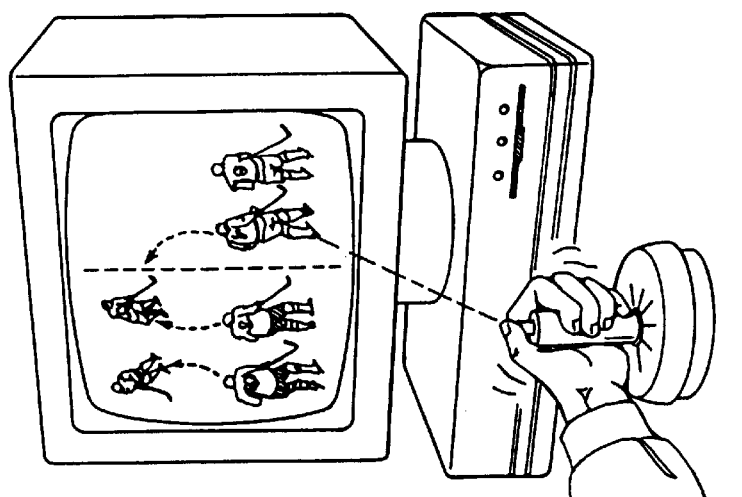
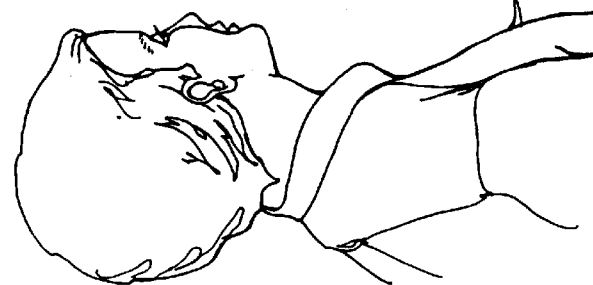
FIG. 5A

US 6,183,259 B1

SIMULATED TRAINING METHOD USING PROCESSING SYSTEM IMAGES, IDIOSYNCRATICALLY CONTROLLED IN A SIMULATED ENVIRONMENT

RELATED APPLICATION

This application is a continuation of U.S. patent application Ser. No. 08/684,435, filed on Jul. 19, 1996, now U.S. Pat. No. 5,890,906 which is a continuation-in-part of U.S. patent application Ser. No. 08/375,616, filed on Jan. 20, 1995, now abandoned, and a continuation-in-part of PCT International application Ser. No. PCT/US96/00919, filed on Jan. 22, 1996, both of which are incorporated herein in their entirety by reference.

BACKGROUND OF THE INVENTION

Technology that has been designed for sports and other activities involving motor skills is generally dedicated to improving strength, swing, motion, balance, speed, and agility. Accordingly, for golf and other sports, swinging motion trajectory is emphasized. For the most part the focus has been on developing aids for the individual athlete to improve a particular physical skill. Relatedly, technology for hazardous or potentially jeopardizing work, such as airplane piloting, is generally directed to practice in a simulated environment. In both areas mentioned above (motor skills and dangerous or jeopardizing work) the emphasis is on the individual taking action, i.e., making movements that imitate real circumstances. The prior art related to sports and physical actions is generally aided by technology directed to biomechanics and locomotion, i.e., to executing motor skills.

There is little technology that is used for instruction or simulation in playing sports such as ice hockey. Commonplace instructional aides include stopwatches, plastic orange cones (used for skating drills), parachutes (pulled to increase leg strength), 2"×4" boards (used for jumping in agility, speed, and balance drills), and surgical tubing harnesses (to increase strength and force the skater to skate while bent forward at the waist). None of the devices noted above provide the student with instructive and cognitive information concerning principles, tactics, maneuvers, skills and strategies used in physical activities such as playing ice hockey. In addition, these devices do not enable the player to receive quantitative feed-back concerning his/her progress in learning and mastering the cognitive aspects of the sport.

SUMMARY OF THE INVENTION

The present invention provides a method and an apparatus for interactive, tutorial, self and assisted instruction and simulated preparation, training and competitive play and entertainment directed toward improving comprehension, exercising cognitive functions and providing amusement. The method and apparatus provide for user interaction with images on the screen of a computer monitor, or other viewing device, containing multimedia, interactive, reconfigurable, audio-visual, tacticle systems.

The present invention provides a user with the opportunity to engage in simulated training or game playing comprised of instructive or ideal images and/or adoptable, controllable images. Such images provide the means by which the user can come to understand what to do using his/her cognitive and visualization skills. The use of such skills typically precedes the use of motor or motion skills.

In one embodiment, as the program executes, an instructive or ideal image displays the preferred style, technique, posture, procedure, skills, drills, positions, maneuvers, tactics, strategies or plays of any activity that calls for using cognitive and motor functions. The user's cognitive functions are developed and/or improved by viewing the procedural methods used by an instructive or ideal image, shown on a portion of the screen. As the program further executes, the user's level of comprehension improves by: (1) receiving information and cues from visual, audio, textual and tactile transmissions, (2) visualizing the actions of the instructive or ideal image, (3) making cognitive choices and decisions as to what manipulations should be made, and then (4) manipulating a user controllable, adopted (by the user) image on another portion of the screen so as to cause the adopted image to simulate or approximate the preferred style, technique, posture, procedures, skills, drills, positions, maneuvers, tactics, strategies or play of any activity represented by the instructive or ideal image.

Alternatively, using the method and apparatus of the present invention, the user learns or is entertained by manipulating the controllable, adopted image(s) on a full or partial screen in competition against one or more instructive or ideal images or against other controllable images.

The present invention can use, for either the instructive or ideal image, or for the adopted, controllable image, or for both, images from live video taping, or animated or computer generated images or live, or robots real time images. It will be apparent to those skilled in the art that the instructive image(s) can teach at any level of expertise from first time beginners to professional experts. Feedback can be provided to all uses.

One embodiment pertains to a method of instruction in ice and roller hockey. More particularly, the embodiment pertains to a tutorial and interactive method for self and directed instruction and simulated training and play in a sport (or other activity) such as ice or roller hockey including, but not limited to, the principles of skating, stickhandling, shooting, checking, offensive and defensive play, positional and situational play, tactical and strategic plays and maneuvers.

The present invention includes observing an instructive (or ideal) way of doing something, receiving information and visual, audio, textual and tactile cues, visualizing what needs to be done and manipulating the adopted image to make sequential, positional changes pursuant to reviewing objectives and options and making choices in a dynamic decision process. This is a cognitive and to some extent a motor process that prepares the individual to engage in an activity coupling cognitive with motor skills. The present invention provides a simulated environment within which to prepare. The present invention combines perceptual experience and cognition with physical sensation and uses cues to facilitate user trial, error and improvement. The present invention facilitates the acquisition of accelerated albeit simulated experience.

By virtue of the facility available to users of the present invention, simulated training can be accomplished as well as simulated drill and maneuvers in taking up proper positions, reacting to situational play and executing tactics and strategies. Further, without a requirement for actual imitative movement of an instructive figure or its movement and without the requirement to use actual tools, implements or equipment, users of the present invention can engage in simulated repetition and/or competition geared to either learning or entertainment and can do so within the economy of space used for a computer monitor and keyboard or other economical, including virtual reality, input devices, (as shown in FIGS. 25 and 26).

The present invention provides facilities for users to engage in simulated training, repetition and entertainment in activities that couple cognitive and motor skills. Such facilities, using skating as an example, include a range of functions such as simply understanding proper positioning for "pushing off" (for example, starting from a stationary standing position while on ice) to sophisticated, preferred, proactive play and preferred reactive play in response to numerous and varied competitive situations. The present invention, by virtue of its capacity to simultaneously present pre-programmed images following a predetermined system of activities and/or images that are controllable adopted by the user also provides for engaging entertainment and amusement.

Using any form of communication of information, including but not limited to floppy disks, CD-ROM disks, a local network, the Internet or wireless communication, users can compete against single opponents, against prior stored images of any individuals (or animations), including themselves or robots and against a full or partial opposing team, group or force. The elements of use of the present invention, including but not limited to viewing preferred or opposing activity, visualizing what the user should do in response to the activity viewed, including identifying options and making choices and decisions and interacting with the present invention through adoptable, controllable images open up a host of imaginative applications and uses for teachers, coaches, trainers, game players and the general public.

An alternative embodiment of the present invention is to have dynamic interaction among all images on the screen so that users may adopt and control all images in a learning, competitive or entertainment oriented environment.

The present invention is particularly well-suited to providing to the user accelerated experience through simulation. The processes of observation, orientation, and judgment are facilitated by the present method and apparatus.

The present invention is not limited to visual sensors but can incorporate others including audio etc. as needed. The use of auditory, visual and other cues decreases distractions and improves comprehension. Using the present invention as a relatively economical training simulator, implementation of visualization in a simulated environment is facilitated. Utilizing pre-programmed, automated and/or user controllable images, the users' awareness of spatial relationships among and between images, objects and locations is enhanced. Dynamic interaction between the images adopted by users, acting in concert as teammates against opposing images as well as dynamic communication and coordination by and between users, whether athletes or not, and other users is also enhanced.

There are multiple opportunities to change the position of an individual or one's entire team, i.e. a group of adopted, controllable images in response to opposing positioning or formations. This can be accomplished using touch sensitive screens or other input devices and will lead to sharpened pre-training in individual and/or team technique. The present invention is applicable to activities other than sports and pastimes.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIGS. 5A and 5B contain pictorial diagrams of two users interacting with another alternative embodiment of the invention.

DETAILED DESCRIPTION OF THE INVENTION

One embodiment of the present invention provides a computer-based system for tutorial and interactive instruction in the sport of ice (or roller) hockey including, but not limited to, the principal activities of skating, stickhandling, shooting, checking and offensive and defensive play, positional and situational play, tactical and strategic plays and maneuvers. The system of the present invention is particularly well suited for use as a tutorial, self-study or assisted study aide and as a cognitive primer for performing the principal activities noted above. The system is also particularly well suited as an aid to instructors, trainers, coaches and officials or trainees at all levels of expertise.

Physical activities such as playing ice hockey (or roller hockey) can be hazardous. As with other hazardous or demanding endeavors, the practice of simulated action or the approximation of preferred action before actual execution is advisable. The use of computer assisted technology to enhance the amount of time to engage in simulated practice can be distinctly advantageous to the user's (the "player/student's") knowledge base. Unlike video and arcade games etc., which do not enable the game player to initiate or react to the actual dynamics of the real game, the present invention requires the player/student to review options, make choices and decisions and to cause the movement of an adopted, controllable image (in the form of, for example, a hockey player) as though he/she were in an actual game.

In the present invention the player/student is involved with hands-on, head-in activity, making actual choices and decisions and causing actual change of on-screen images in a virtually real environment under virtually real conditions. This type of control and initiative and the relevancy and accuracy of the simulation and the feedback, lead to a richer (robust) learning experience. Accordingly, the present invention also relates to a variety of sub-components of the principle activities noted above, such as, agility, balance, impact/contact, timing, and "read and react" skills.

Figure 11:
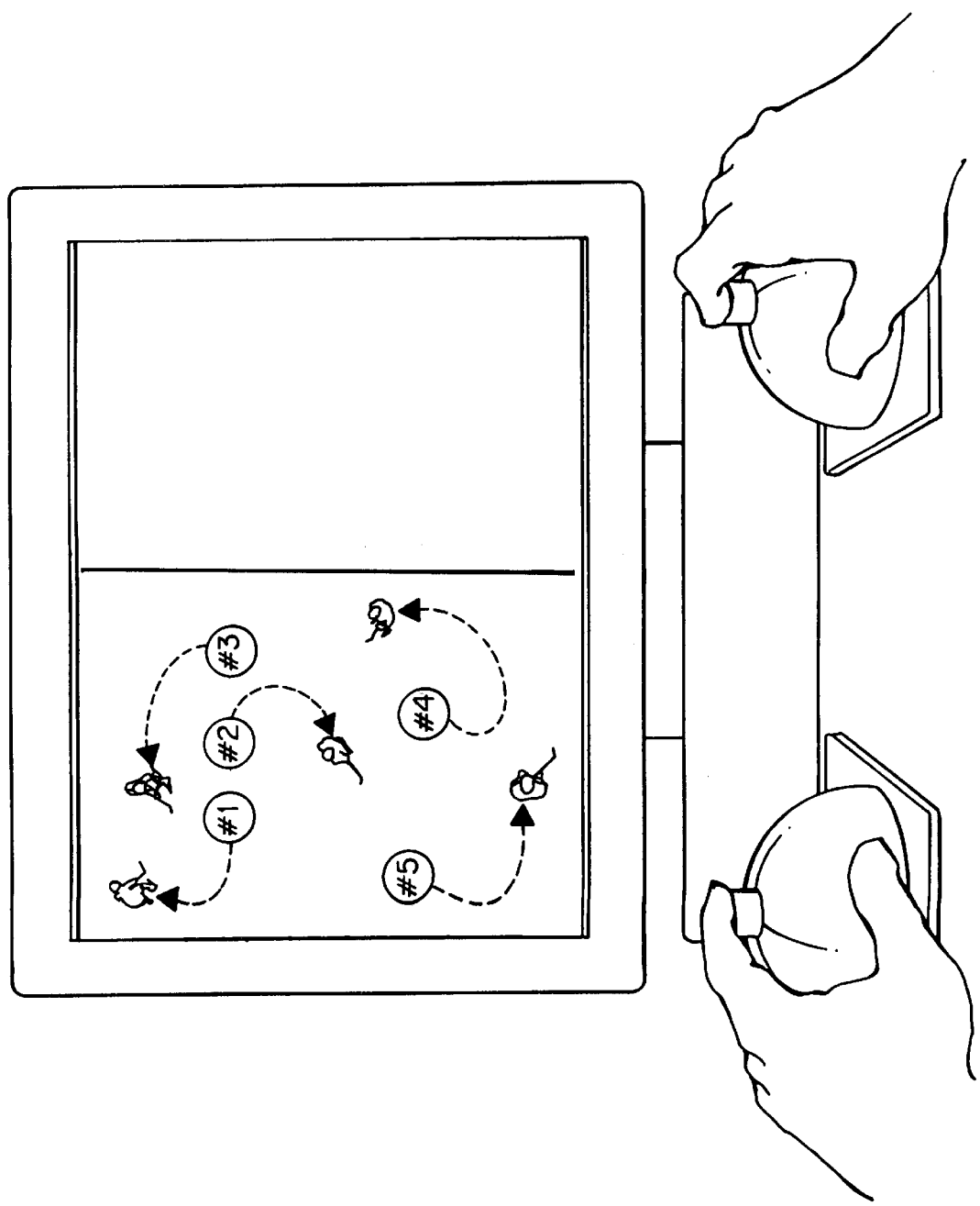
Figure 16:
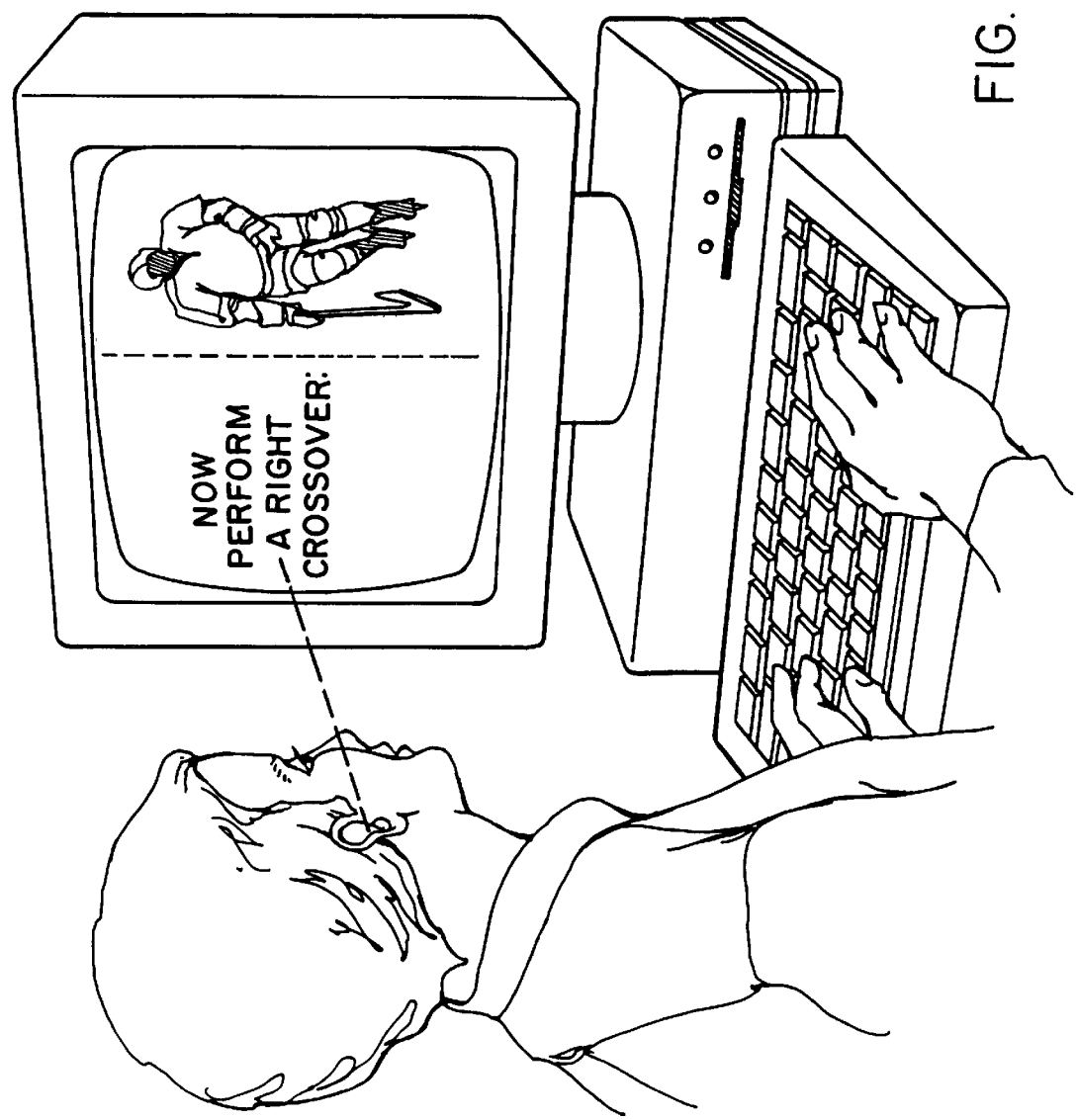
Figure 17:
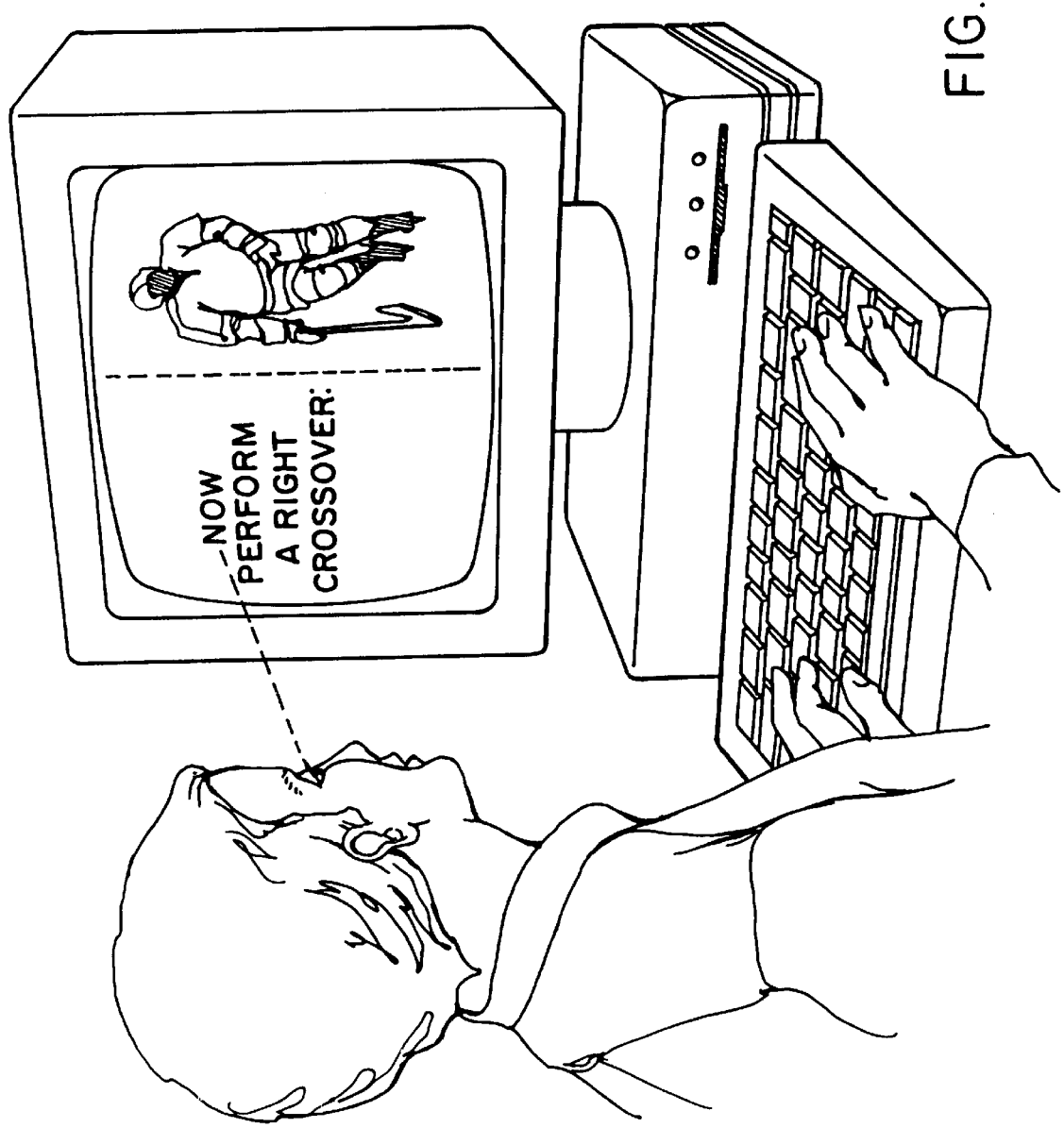
Figure 31:
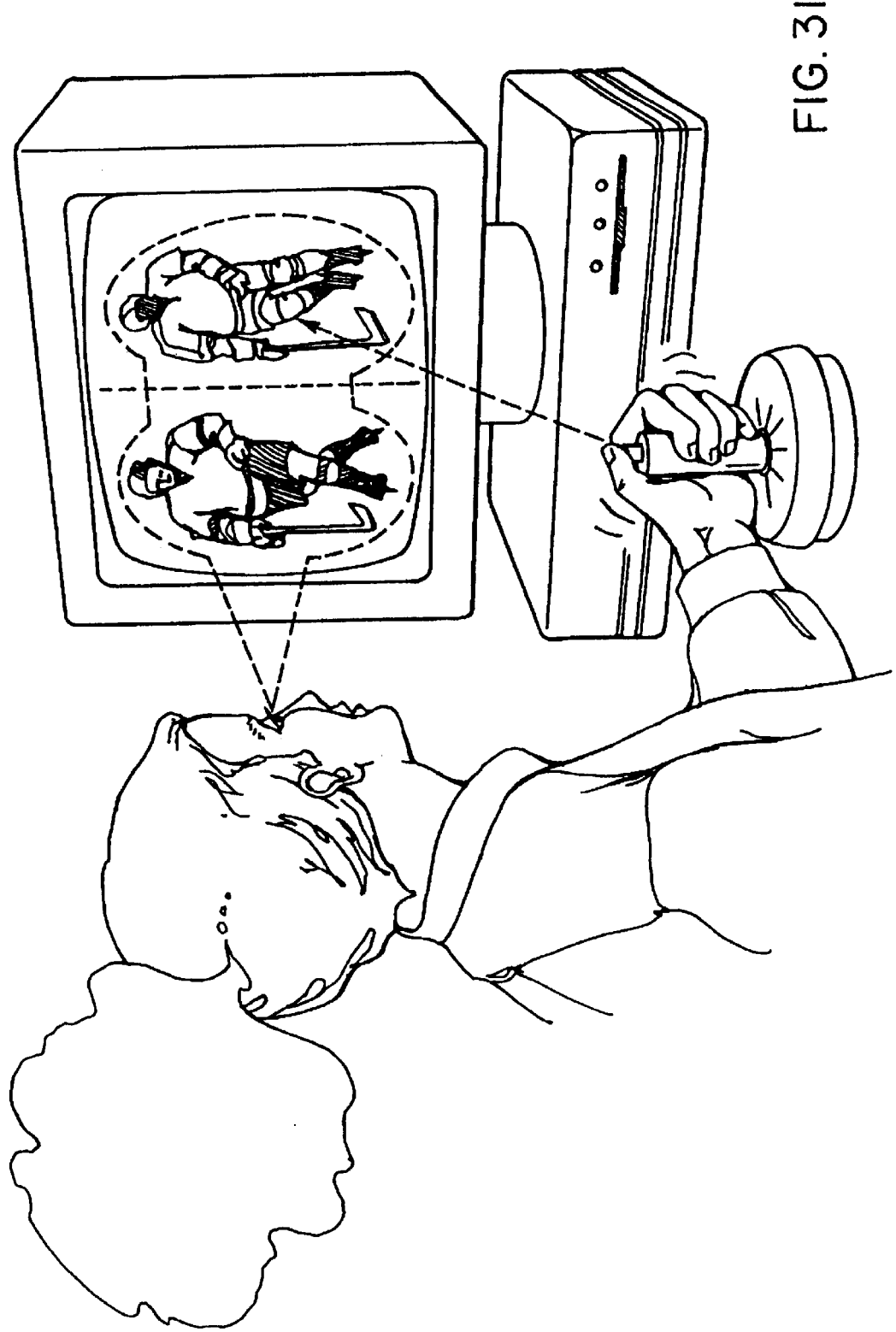
Figure 32:
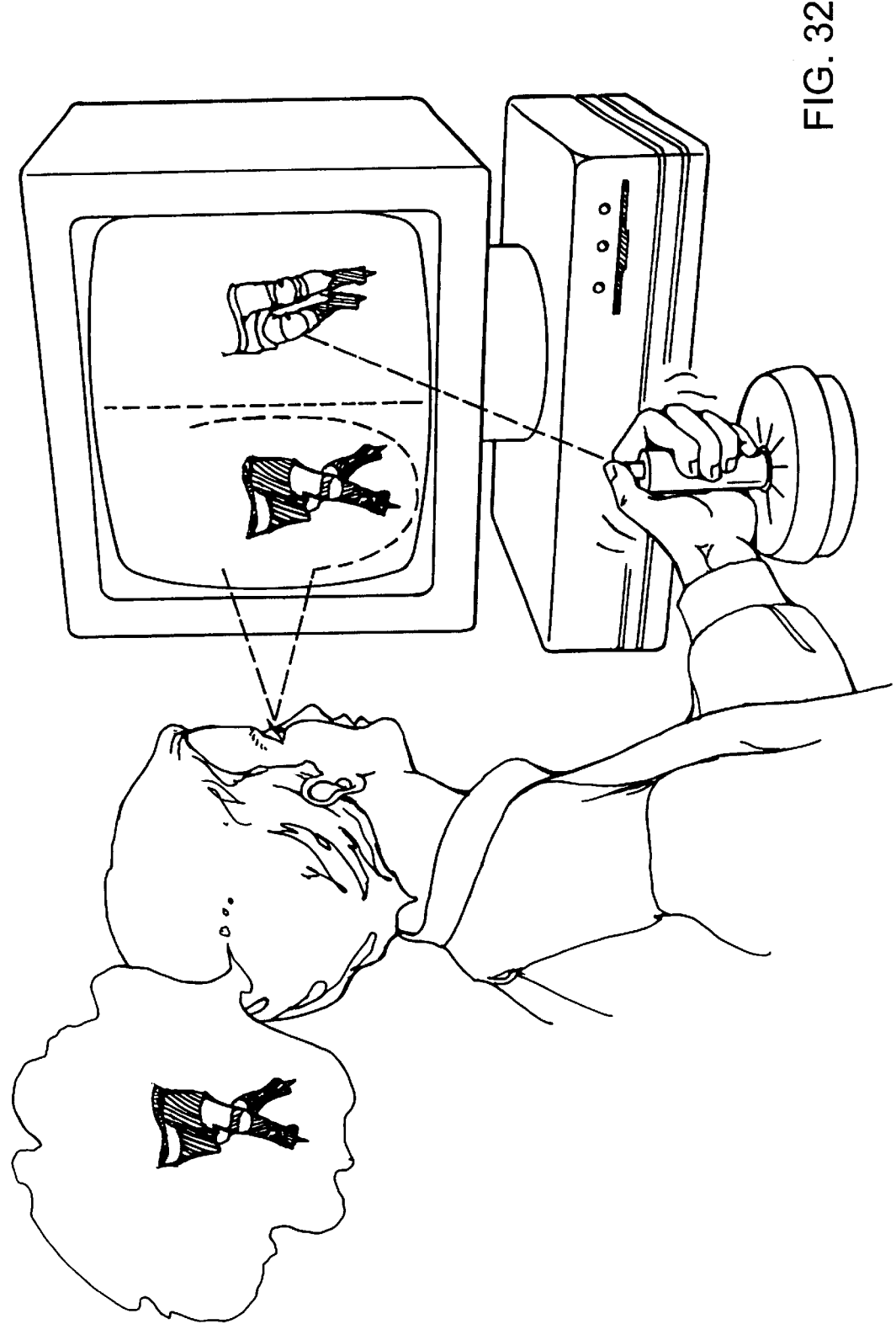

The computer system of the present invention enables the player/student to see and hear (on a computer screen or other device) how a particular skating, stickhandling, checking or other skill or drill can be performed (as shown in FIGS. 16 and 17). The player/student, by observing an instructive or ideal image of the skill being performed, is presented with a clear example (as shown in FIGS. 11, 31 and 32). The player/student can then interact with the system by visualizing the example shown and actually cause an on-screen adopted image to perform the skill or drill by approximation. Feedback on the user's individual performance in comparison to the instructive or ideal pattern is visible in real time. Since feedback occurs in real time in the invention and since proficiency scores are posted on screen at the end of each drill, the invention may be used by anyone. Feedback can also be delayed and/or printed out in hard copy or distributed by other means.

For each preferred style, technique, posture, maneuver, position, tactic, skill, drill or play of any activity, the computer system of the present invention can provide an animated or digitized image of a player (or players) who performs the instructive or ideal performance (example). The instructive or ideal performance can be accompanied by textual and/or auditory tutorials. For some purposes the lesson may end at that point. For other purposes an interactive instruction can follow and for still other purposes a competitive or amusement scenario will ensue.

Figure 9:
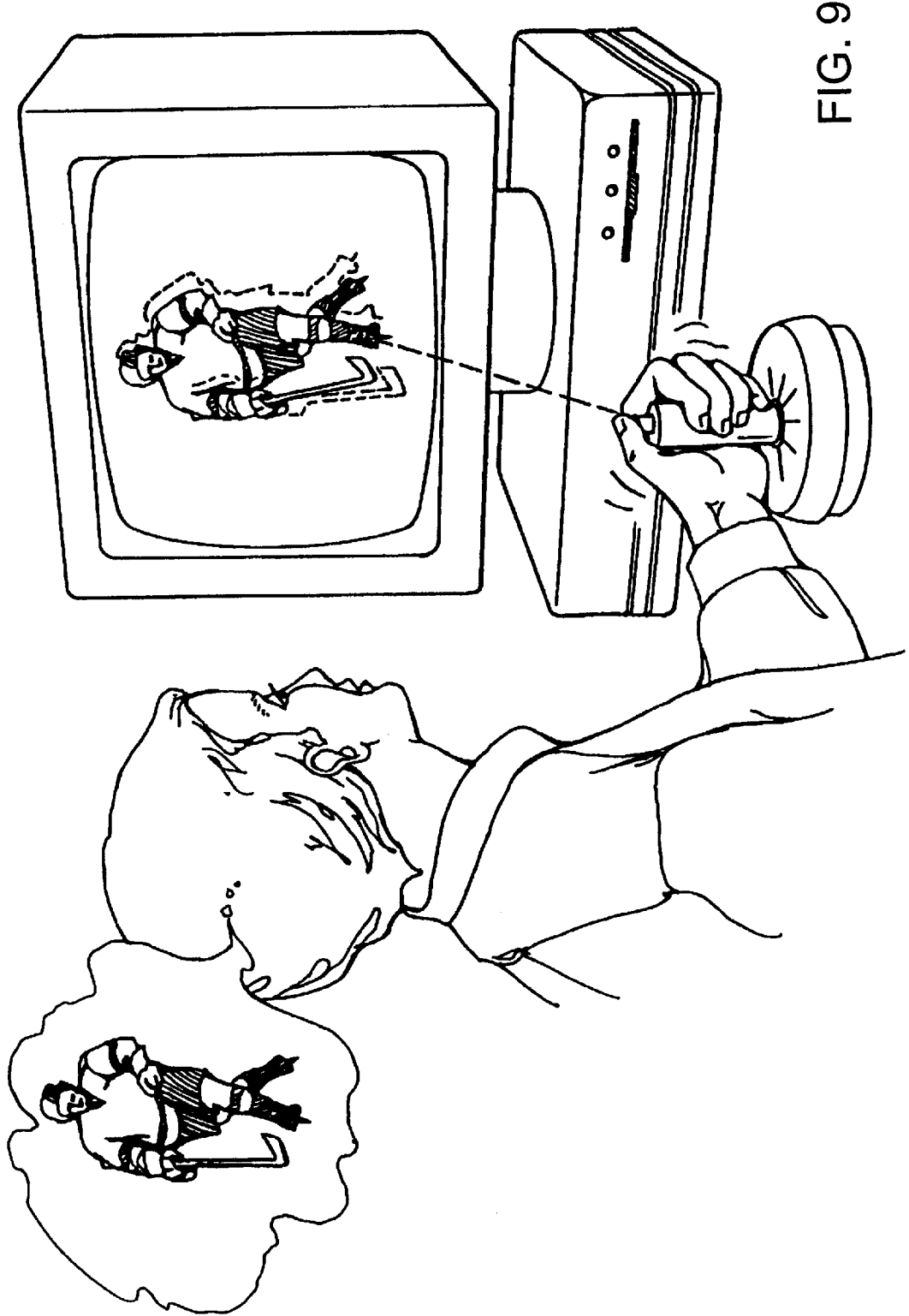
FIGS. 9–32 are the pictorial diagrams of a user interacting with different embodiments of the invention.
Figure 20:
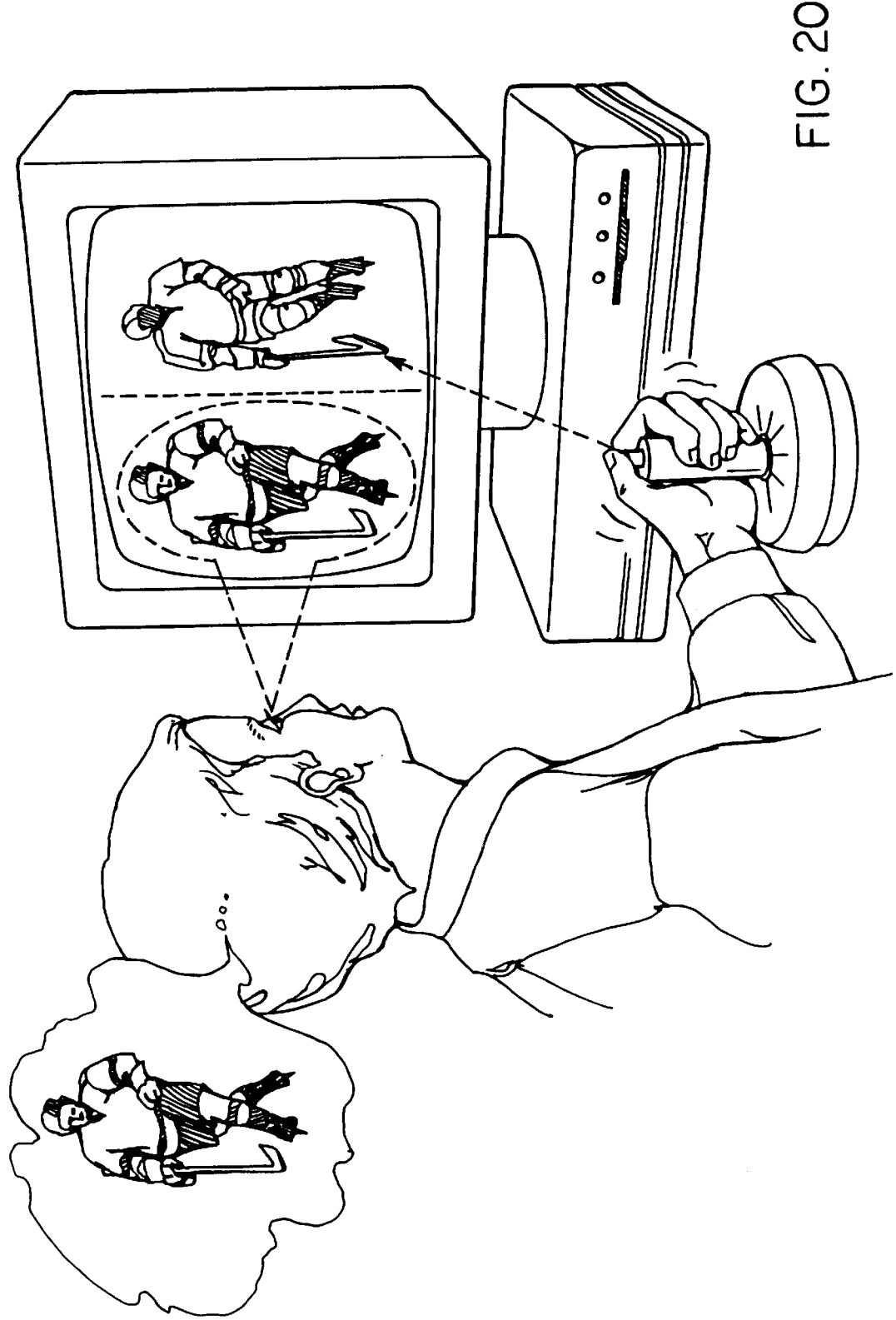
Figure 29:
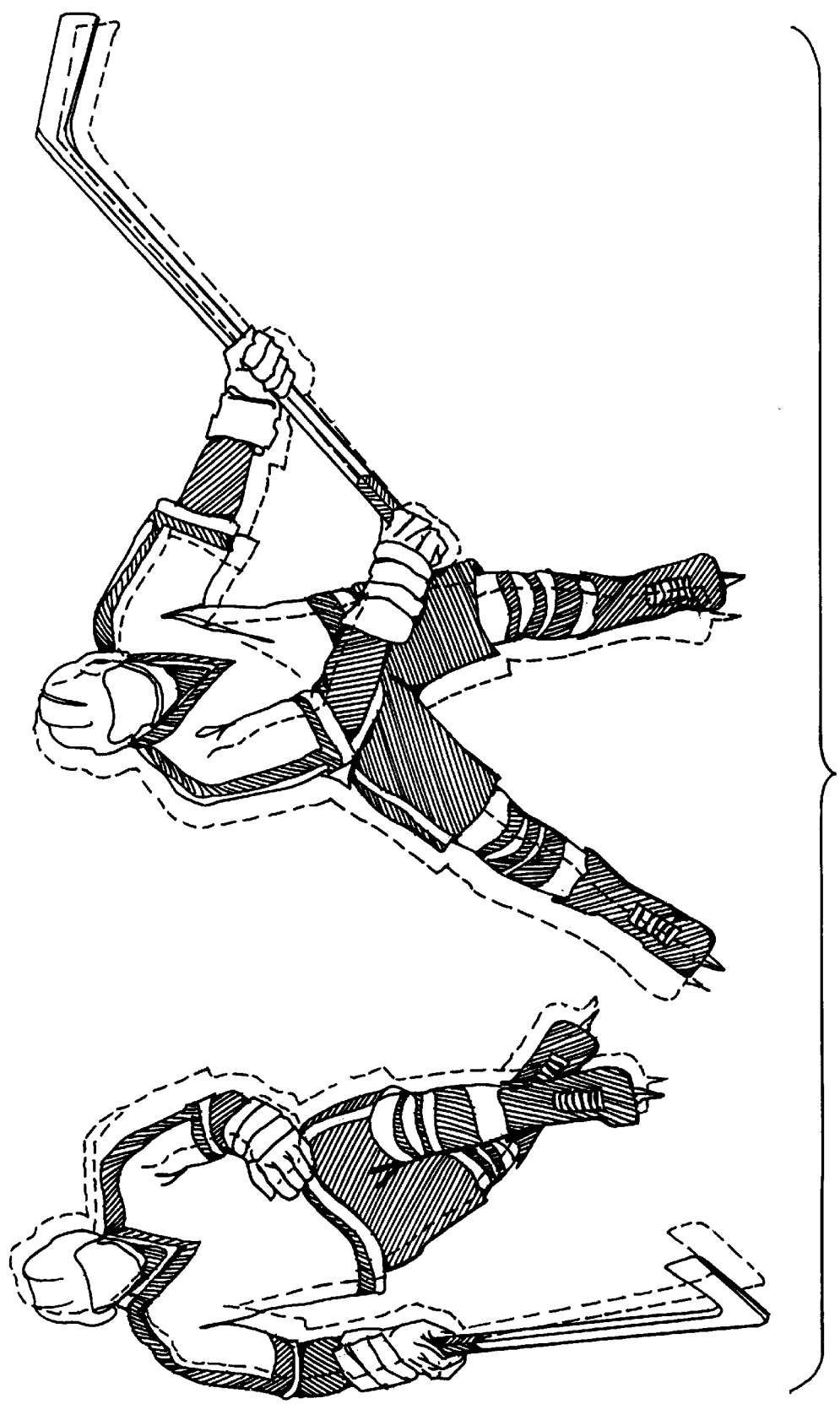
Figure 30:
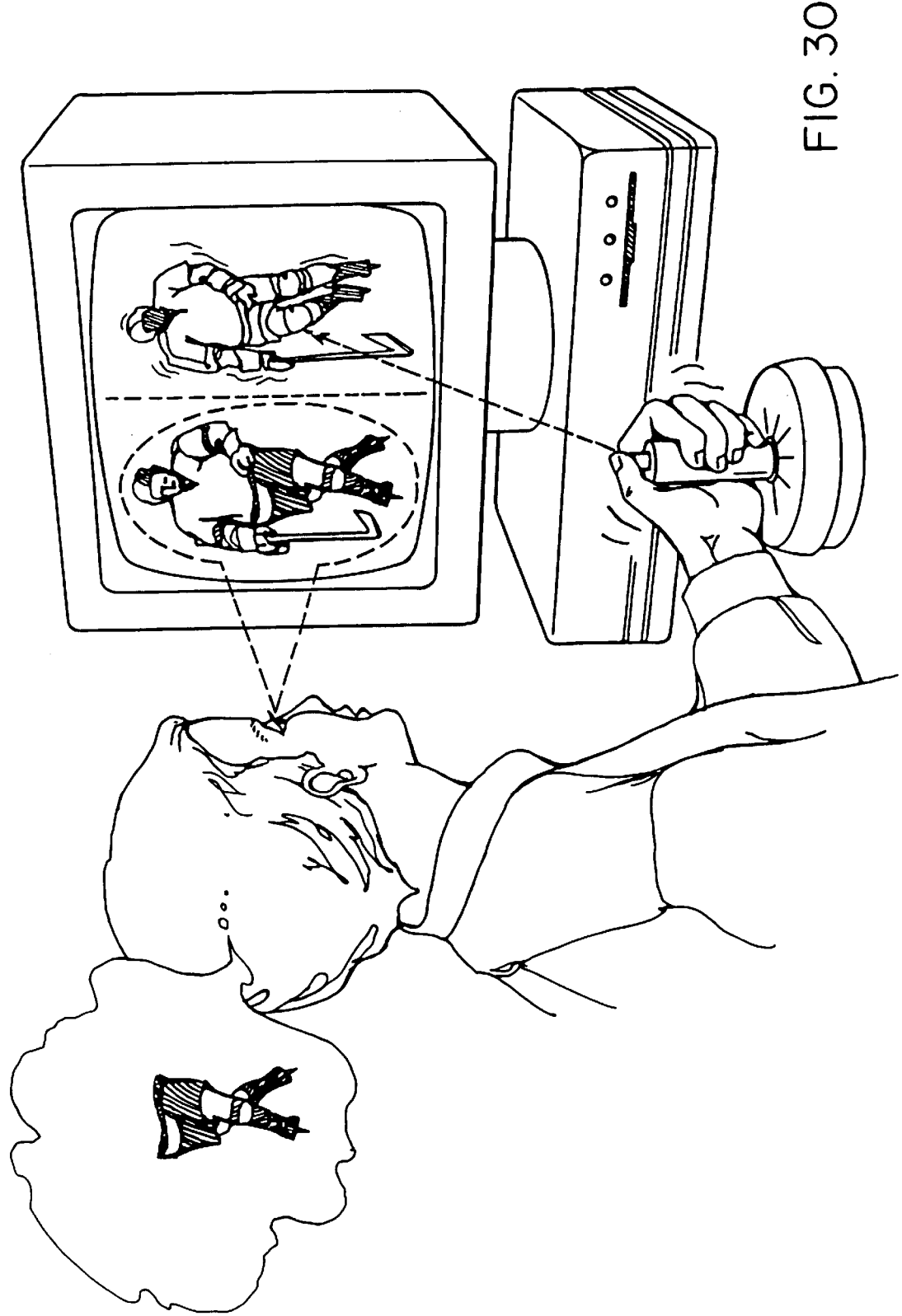

The interactive session can call upon the player/student to cause his/her adopted animated or digitized image(s) to execute maneuvers under the direction of the player/student. The present invention may use the ideal skater as is or may transform an animated or digitized ideal skater into an anatomical outline and provide that the outline have superimposed upon it or set beside it an "adopted" silhouetted figure which will make sequential positional changes at the direction of the player/student (as shown in FIGS. 9 and 29). This calls upon the player/student to understand the positional changes including the physical movements that are required by the maneuver and to strive to have his/her adopted image make those movements and sequential positional changes (as shown in FIGS. 20 and 30).

Since this interactive game can be played by pitting the adopted controllable image against the instructive or ideal image example, the difference between the execution by the player/student controlled image and ideal execution can be measured. Auditory and/or textual prompts can be given in real time as well as a score registered at the end of the exercise. For any given (predetermined) skating step, stride or maneuver, the player/student will have positive or negative feedback in both audio and visual form based on his/her ability to cause the controllable adopted image to approximate the drill being displayed. Advancements to the next higher level or repetition for correction are integral parts of the invention.

The applications of such instruction are numerous. Player/students will learn what they will be called upon to do on the ice. The opportunity for self-drill and repetition is excellent. Mental preparedness can be enhanced. Uniformity and economy in coaching and instruction can be enhanced. A lesson can be designed in advance, as can game plans. Computer usage (if not literacy) can be a learned by-product. Certain principles of geometry and physics can be learned in conjunction with understanding how efficient and effective execution of skills leads to enhanced results. For example, how tighter turns shorten the distance between present location and desired positions on the ice or how good balance, timing and form lead to increased skating speed and strength.

Figure 19:
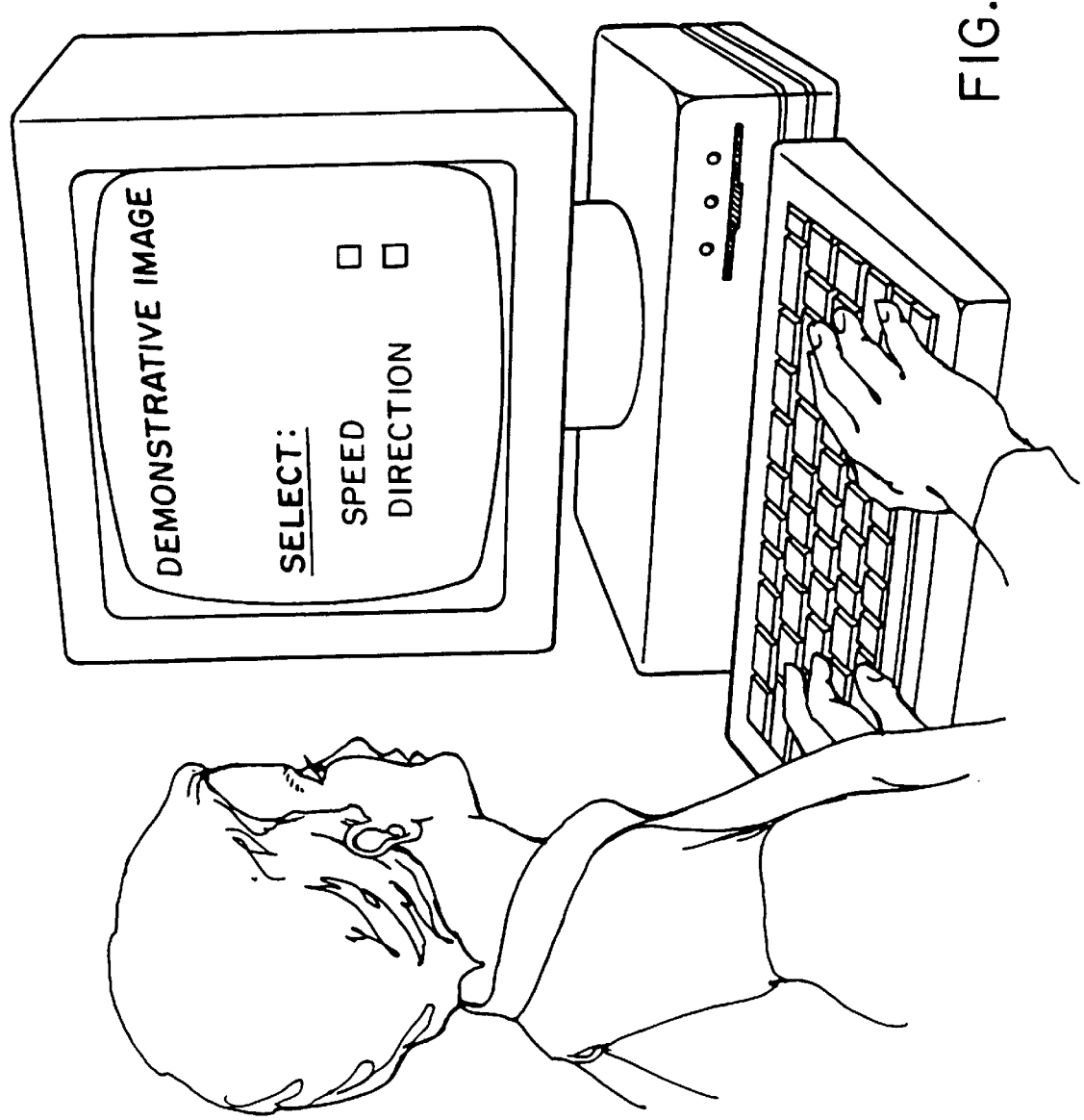

Benefits of the present invention include the opportunity to visualize an instructive or ideal image of specific skills and maneuvers used in ice hockey. The player/student can see how the skill or play can be executed as a dynamic whole (either in slow motion or actual speed) or can pick apart the skill or play by viewing images frame by frame (as shown in FIG. 19). The latter method enables the student to see details of the ideal maneuver which might not be apparent in a moving image.

The player/student is able to learn each skill at his/her own pace. Since images can be moved frame by frame and repeated as many times as desired, the player/student will be able to perfect his/her understanding and performance of each skill. Repeating each maneuver will improve recollection of what has been learned.

Figure 12:
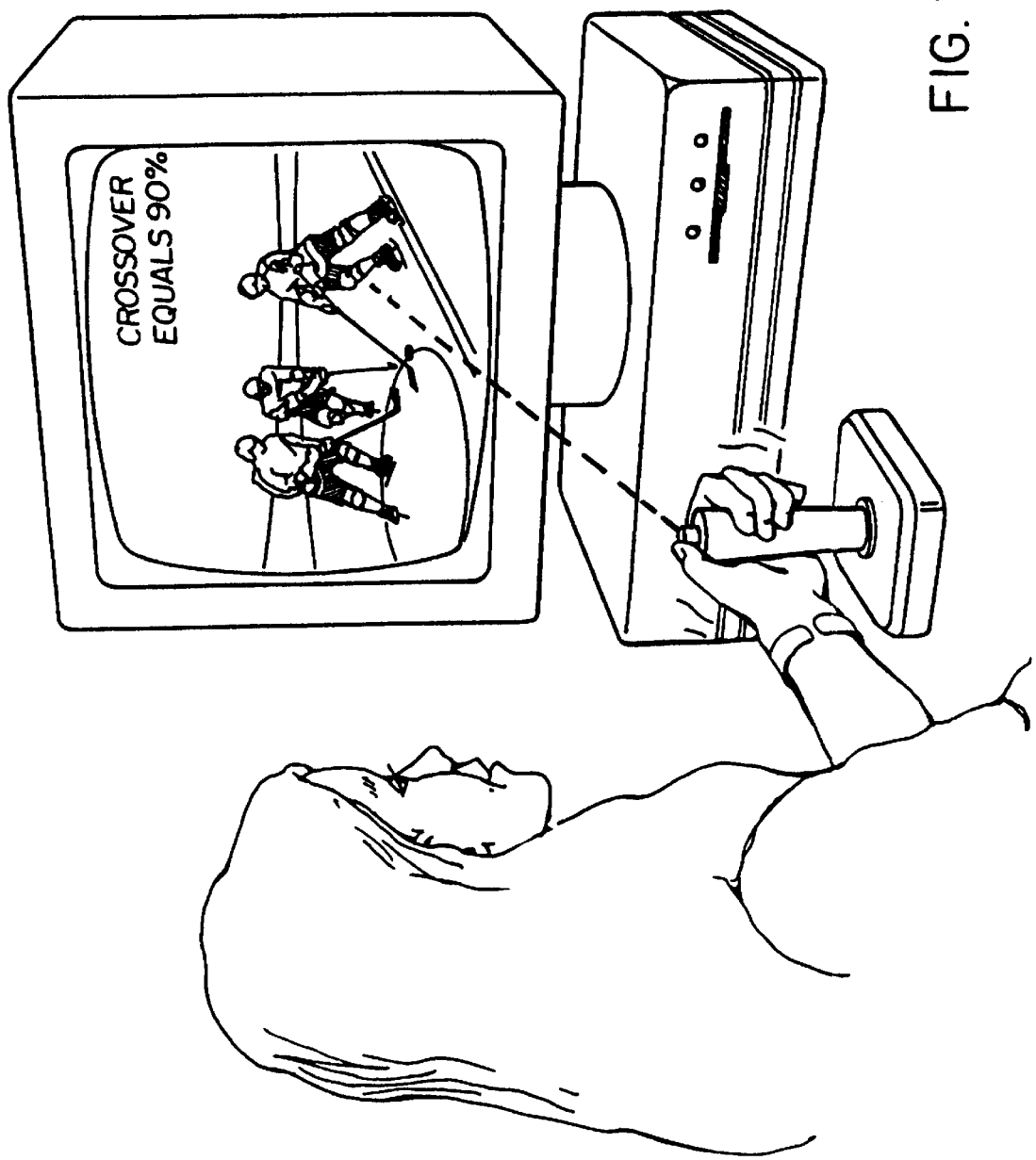

Feedback can be received in real time by the player/student as he/she is able to see on the computer screen how closely the adopted controllable image approximates the ideal imager (as shown in FIG. 12). In addition, the invention can provide means to numerically evaluate the player/student's ability to match the sequential positional changes and maneuvers of the ideal image. The quantitative evaluation will make it possible for the student to monitor his/her progress in performing the skill, play or tactic each time it is practiced.

Benefits to instructors include consistency and objectivity in the information given to each player/student. Each player/student will receive the same information and will be able to repeat the lesson or "game" until sufficient comprehension is acquired. Since player/students will be able to use the present invention independently, staff time can be quantitatively and qualitatively enhanced. Instructors and students will be able to select areas for more or less concentration and repetition, including what should be done in actual practice. Use of the present invention will also be of benefit if access to ice hockey rinks is limited or, conversely, more can be made of available ice time. Accident or injury reduction can result from increased awareness of dangerous situations or conditions.

Figure 10:
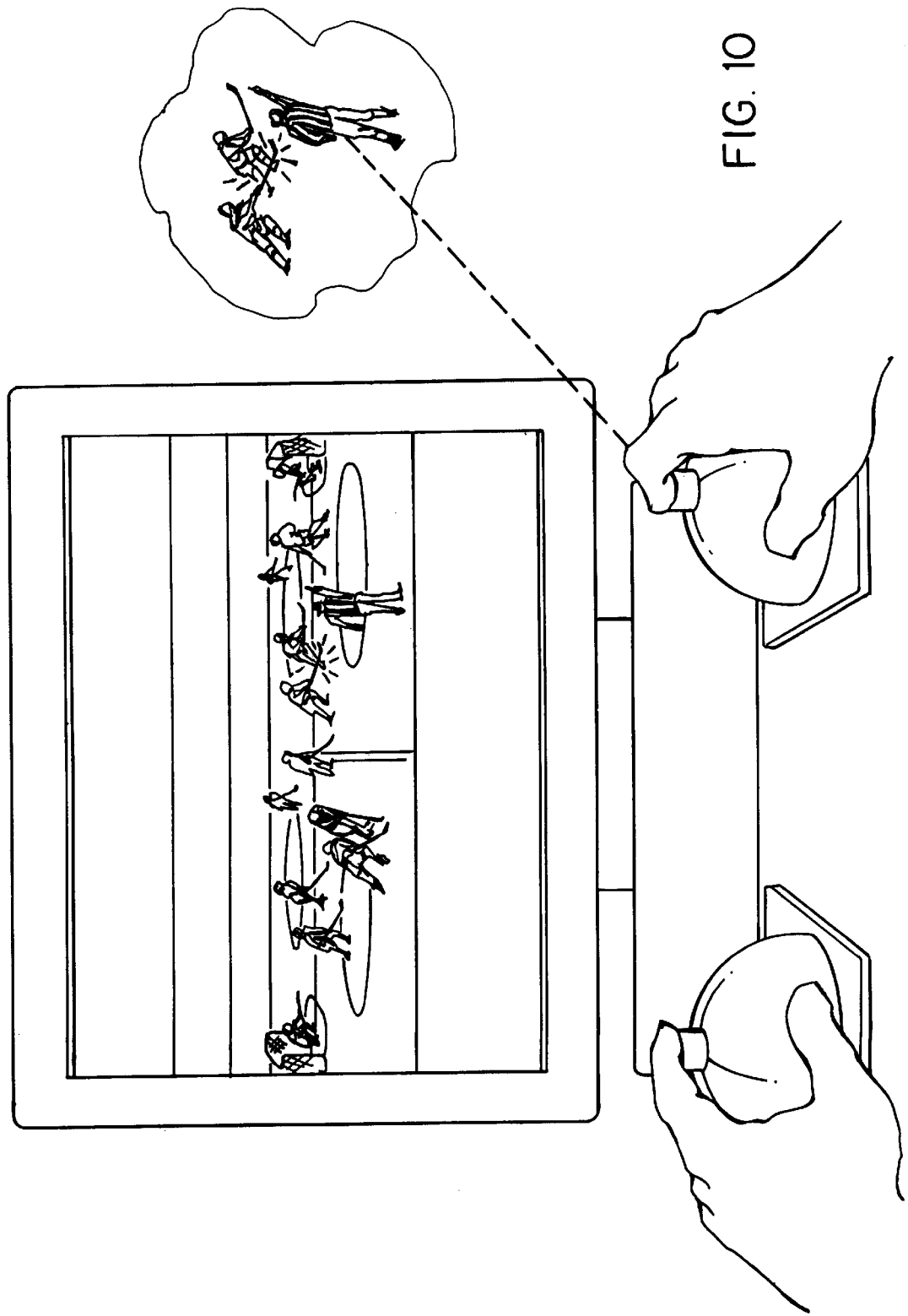

An additional embodiment of the invention enables officials (referees, linesmen, and other officials) in the sport of ice hockey or in other sports or activities to practice positioning and making decisions regarding infractions of the rules while watching and controlling digitized images on a computer screen (as shown in FIG. 10). The digitized images include preselected plays or maneuvers executed by a single player against one or more opponents or by a player in combination with one or more of his/her teammates playing against an opposing team including one or more players or actions taken by team coaches, managers and others.

The officials view the execution of the play, while moving an "adopted" official, in digital form, to the best vantage point from which to see the plays, and decide whether the actions of the player or players or coaches are within the rules of the game or constitute an infraction of the rules for which a penalty is levied. The invention enables officials to record their decisions in the computer system.

The digitized images can be obtained from video tapes of live athletes playing ice hockey or from animated or computer generated or robotic sources. Appropriate sections of the video tape or other images can be selected and converted to or maintained in digitized format. The selected images can be viewed on a computer screen. Officials are able to speed up or slow down the images as they appear on the screen. Alternatively, the speed of on-screen action can be controlled by persons responsible for assessing the officials, performance. Officials can be required to move their adopted on-screen official image so as to be in the best position to see the play and make a call when warranted. Reverse angle views of the digitized images can be available on demand to provide real time feedback on whether a play included a foul or was cleanly executed.

After viewing each specific image sequence, the official can enter into the computer his/her decisions regarding the legality of the plays previously observed. The results are compiled by the computer and fed back to the officials via the computer screen or by hardcopy printouts.

The benefits of this embodiment include the opportunity for officials to practice decision making at their own pace in a relaxed environment. As with the previous embodiments of this invention, the images on the computer screen can be viewed frame by frame, or at any speed from slow motion to real time to super real time, and repeated as many times as desired. This will enable officials to study details which can be missed in the fast, high pressure setting of a hockey game or to test their skills in making calls at real time rates of speed or even faster (super) than actual playing speed. As the officials progress in their decision-making abilities, the images which are viewed at increasingly faster speeds, either real-time or faster, provide practice in quick orientation, observation and judgment and thereby sharpen officiating skills.

After each image sequence has been viewed, the official can use means such as a computer keyboard, mouse, joystick or other input device to input his/her decision regarding the legality of the observed plays into the computer system. The official is presented with a list of possible infractions and asked to select those infractions observed during the image sequence. The official gains points for correct judgments and lose points for incorrect judgments. At the end of the exercise, the computer can display a numeric score as well as a list of incorrect decisions. The score and list can also be printed in hardcopy format if desired.

If the user does not achieve a certain level of proficiency, he/she can be required to loop back and repeat testing on the image sequences previously viewed before advancing to a higher level. As with other embodiments of the invention, the computer can keep a record of the proficiency scores for each official. Current scores may be compared to those attained previously. This will enable each user to monitor his/her progress in perfecting his/her decision-making skills.

The purpose of this embodiment is to accelerate the experience and improve the positional and judgment skills of officials in ice hockey by increasing the number of decisions made while observing actual hockey plays and maneuvers. Officials obtain practice in orientation, positioning, observation and judgment. Officials can rehearse preferred positioning so as to decrease interfering with play. Consistency and objectivity will be increased. The rules of the game will be reinforced in the minds of the officials. In addition, use of this embodiment of the invention may also help students and players of ice hockey to learn the rules and regulations of the game.

Figure 1:
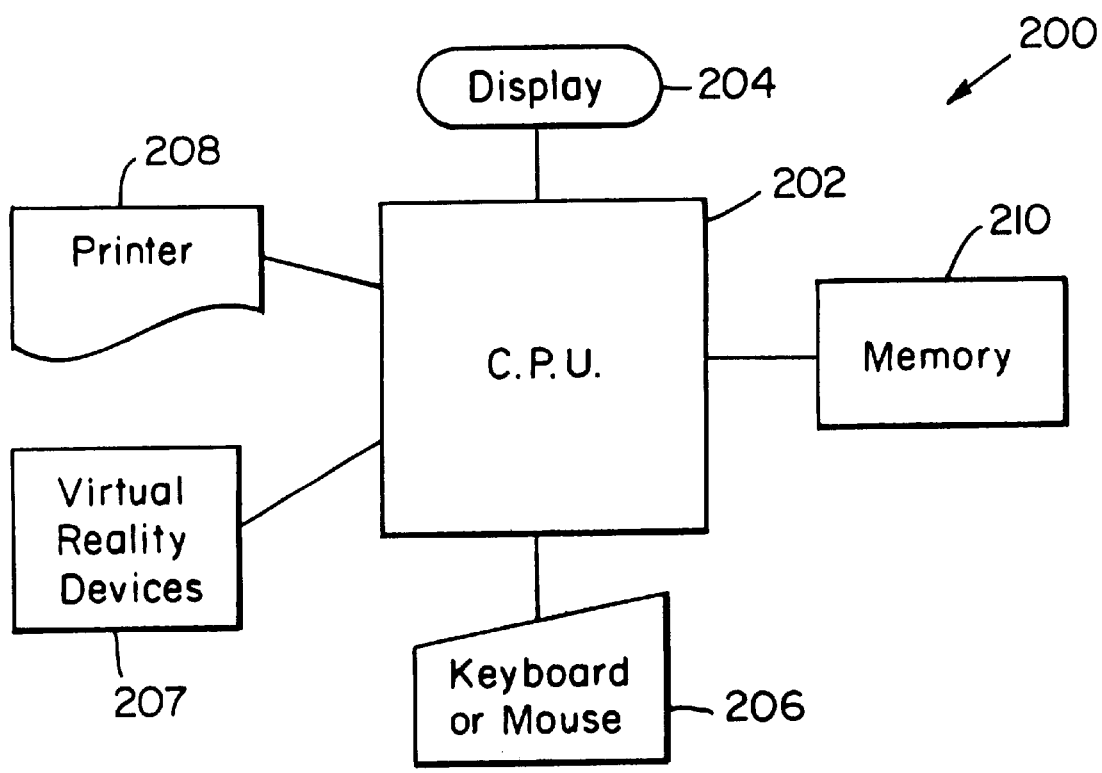
FIG. 1 is a block diagram of a computer software system constructed according to the present invention.

FIG. 1 contains a block diagram of one embodiment of the computer system 200 of the invention for simulating physical activities such as skating and hockey maneuvers and for entertainment use according to the present invention. The system comprises a central processing unit (CPU) 202 which can be, but is not limited to, a microcomputer such as a personal computer operating with an Intel 80X86 microprocessor, a Motorola 680X0 processor, or a Power PC processor. The CPU 202 is coupled to a display 204, such as a CRT screen, for displaying images and prompting the user for the input of information. The CPU 202 is also coupled to an input device or devices 206 such as a keyboard, joystick, etc., for the input of information from the user and a printer 208 for printing information such as player/student accomplishment information in hard-copy media. Input and output with the user can also be accomplished with virtual reality devices 207 such as a virtual reality glove and helmet worn by the user. A memory 210 is provided, coupled to the CPU 202, for the storage of program instructions and data, recorded images and other information.

Several versions of computer programs are encompassed by the present invention. Each version varies in complexity as each is directed toward a player/student at a different level of expertise. Versions developed for home, rink, and arcade use are instructional as well as entertaining. More complex versions for use in structured training facilities are developed. For each version, the computer system stores a series of lessons and corresponding "ideal" images in a database.

Figure 2A:
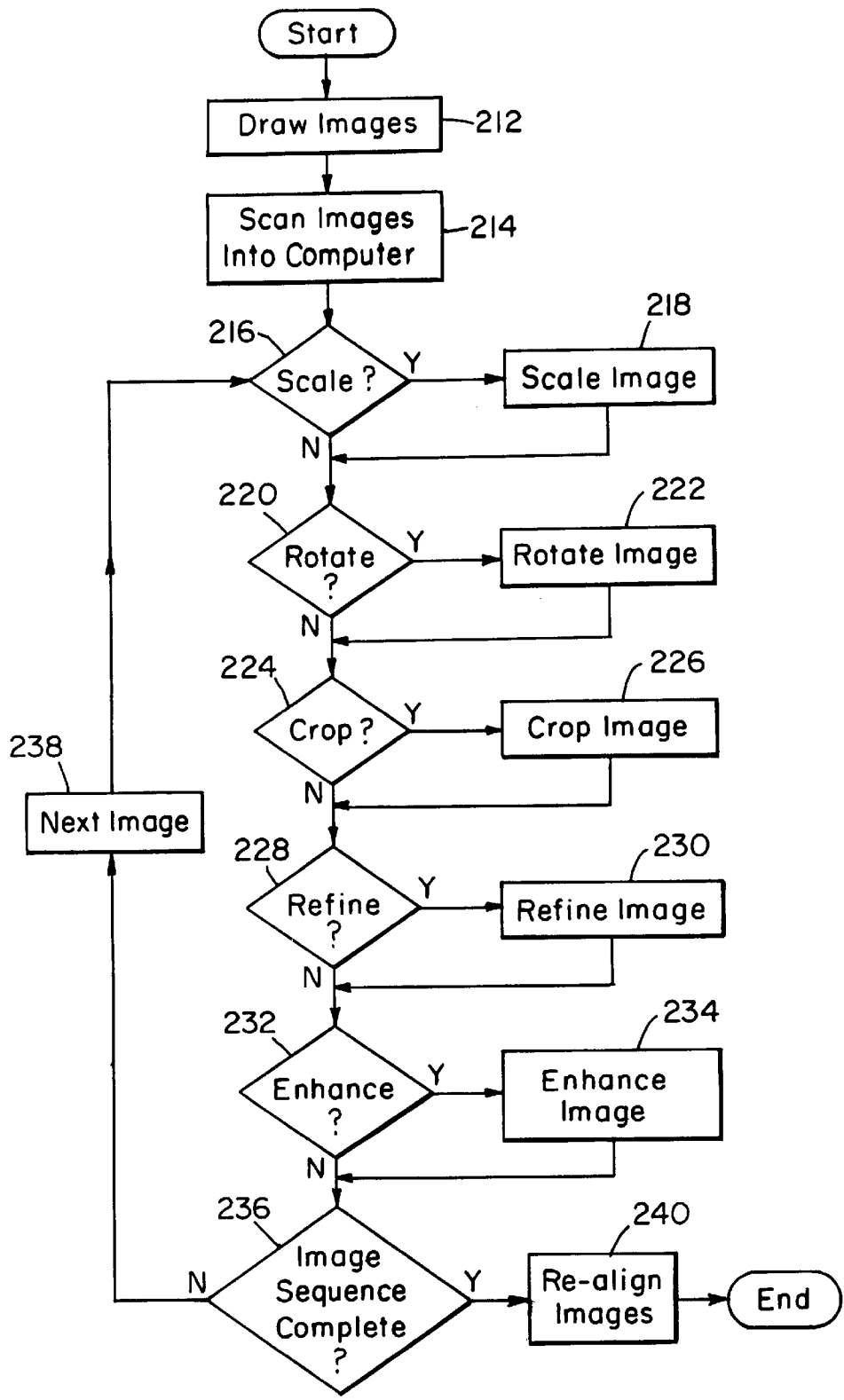
FIGS. 2A–2E contain flowcharts of the logical flow of the system of the present invention for preparation, processing of and interaction with video images.

FIGS. 2A–2E contain flowcharts which illustrate the logical flow of the computer system(s) used for the preparation and operation of the system of the present invention. FIG. 2A shows the procedure for scanning images into the computer system 200 and preparing them for display on the computer screen 204.

Steps 212 and 214, images for a particular skill or maneuver are scanned into the computer system 200. Individual drawings are created and scanned to complete the sequence of the instructive "master" or "ideal" hockey player performing the skill or maneuver as well as to encompass all possible movements that the player/student-controlled ("adopted") player may perform.

After all the instructive images in a given sequence have been scanned, the images can be prepared for display on the computer screen. This can be accomplished with a number of commercially available computer packages, including Photoshop, Photofinish, NeoPaint, Paint, Graphics Designer, and Correlpaint. In blocks 216, 218, 220, and 222, the images can be scaled or rotated, as necessary. If any images contain unwanted elements, they can be cropped in blocks 224 and 226. In blocks 228 and 230, the images can be refined to remove unwanted lines or blotches or to add lines that have faded during scanning. In blocks 232 and 234, the images can be enhanced by adding elements such as background or motion lines.

Each image is prepared in turn in the loop under control of blocks 236 and 238. After each image in the sequence has been prepared, it can be aligned with others on the computer screen in block 240. The preparation stage ensures that the images can be displayed as a smooth animation sequence when the program is run by users. All or any portion of a controllable figure can be displayed from any perspective.

In an alternative embodiment of the invention, images recorded by video tape can be used instead of the hardcopy drawings described above. In this case, video recordings are made of a particular skill or maneuver. Each frame of the video tape is digitized so that it can be stored in computer files using a standard such as JPEG (Joint Photographic Expert Group), MPEG (Motion Picture Experts Group), FLI, FLC, etc. The sequence of images is refined in connection with FIG. 2A. The result is a series of images in computer-readable form similar to those obtained from the hardcopy drawings described above. Images need not be exclusively drawn images or video images; mixed images may be used. Images can be obtained by videotaping an actual player performing a maneuver or by videotaping performance of the maneuver by preprogrammed robots such as the robots described in co-pending U.S. patent application Ser. No. 08/375,617, filed Jan. 20, 1995, entitled "Mechanized Robots for use in Instruction, Training and Practice in the Sport of Ice and Roller Hockey," by Vincent J. Macri, which is incorporated herein by reference. Polarized reflective markers can be attached to the player or the robot to enhance the video image. Alternatively, active motion sensors can be used.

Figure 2B:
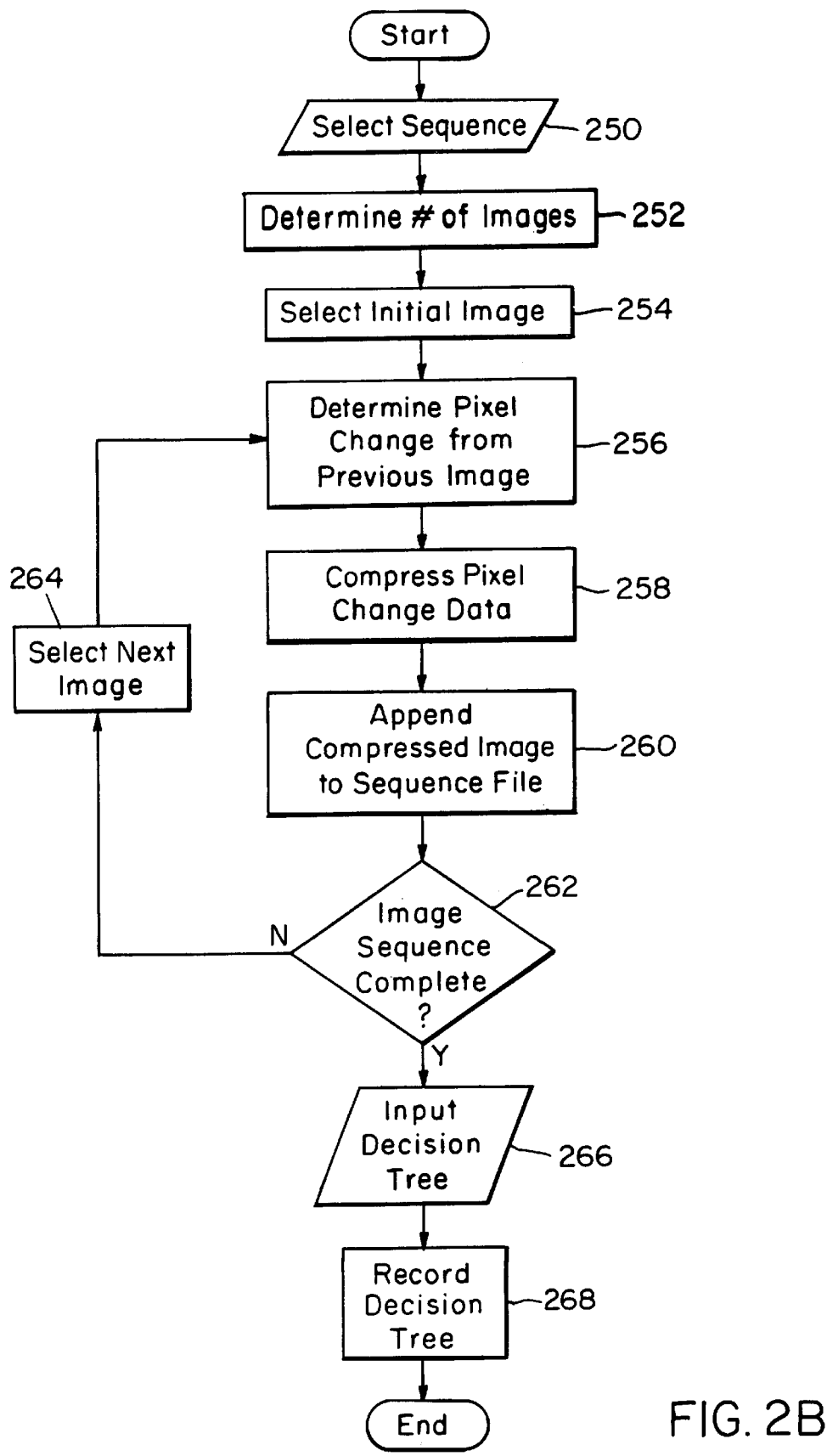

FIG. 2B contains a flowchart showing the process of compressing the computerized files containing each sequence of drawings to conserve storage space. The process involves comparing each drawing to the next one in the sequence and recording only those pixel elements which have changed from one drawing to the next. Other compression techniques also exist and may be used.

In blocks 250 and 252, a sequence of images is selected, and the number of images in the sequence is determined. Beginning in block 254, with the initial image that would appear on the screen, each drawing is compared to the previous drawing in the sequence. In the case of the first drawing in the sequence, the comparison is made to an empty screen. Each pixel element which has changed from one drawing to the next is identified in block 256 and the change data is compressed in block 258. The compressed data is then stored in a sequence file in block 260. This procedure is repeated for each drawing in the sequence in blocks 262 and 264.

Referring to blocks 266 and 268, the relationship between each of the drawings is input in the form of a decision tree and recorded in a computer file. In the case of the sequence of the drawings representing the instructive master or ideal image, the decision tree is defined as a linear relationship progressing directly from the first frame to the last. In the case of the player/student controlled image, each frame is connected to a series of other frames representing the different ways in which the student can move the animated figure. The relationship between each interconnected image must be defined and stored. To make the definition of the decision tree easier, each part of the body which moves (such as an arm or leg) can be defined as a separate series of images. Composition of several partial images into a whole can provide the completed image.

Figure 2C:
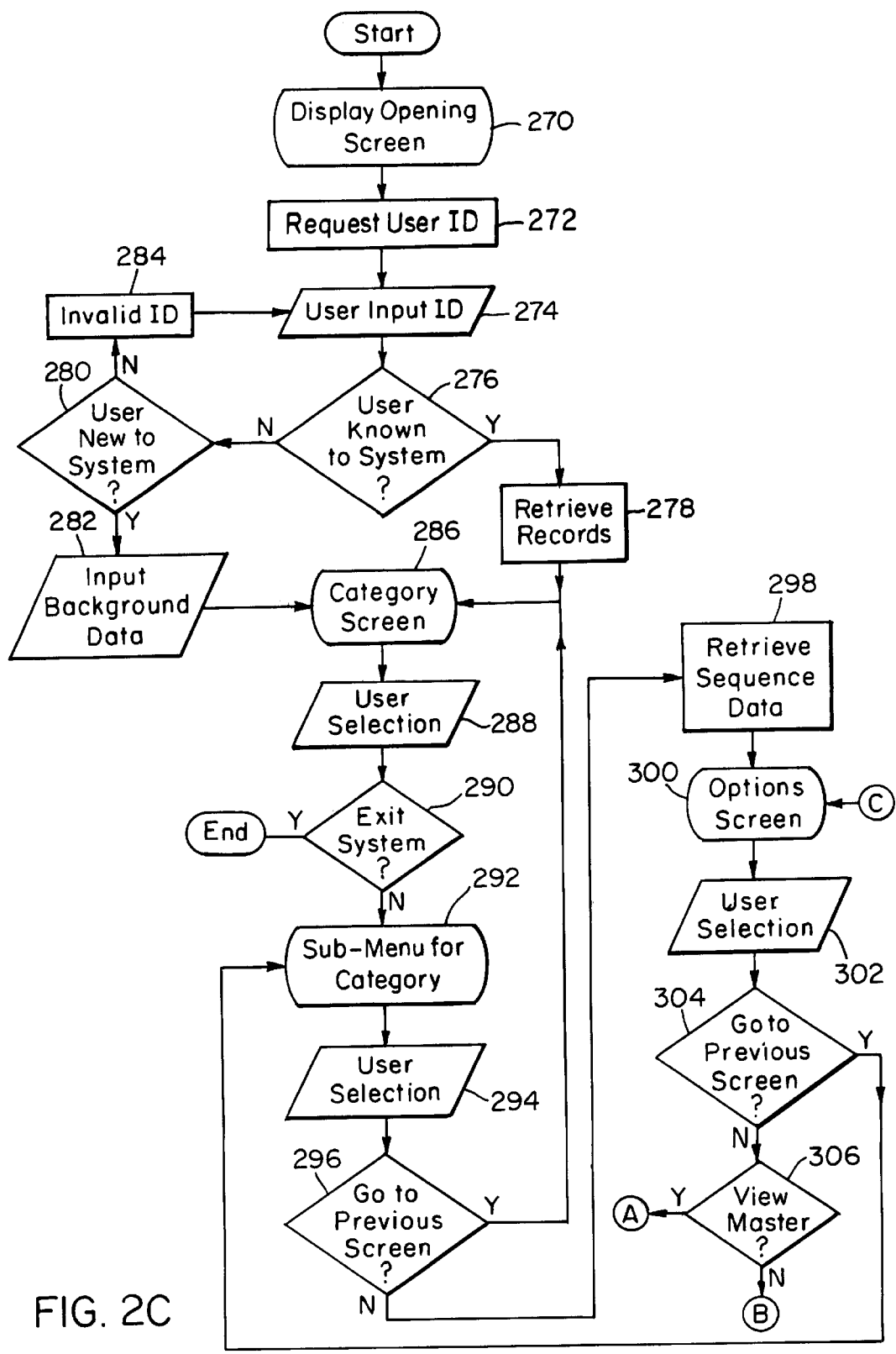
Figure 2D:
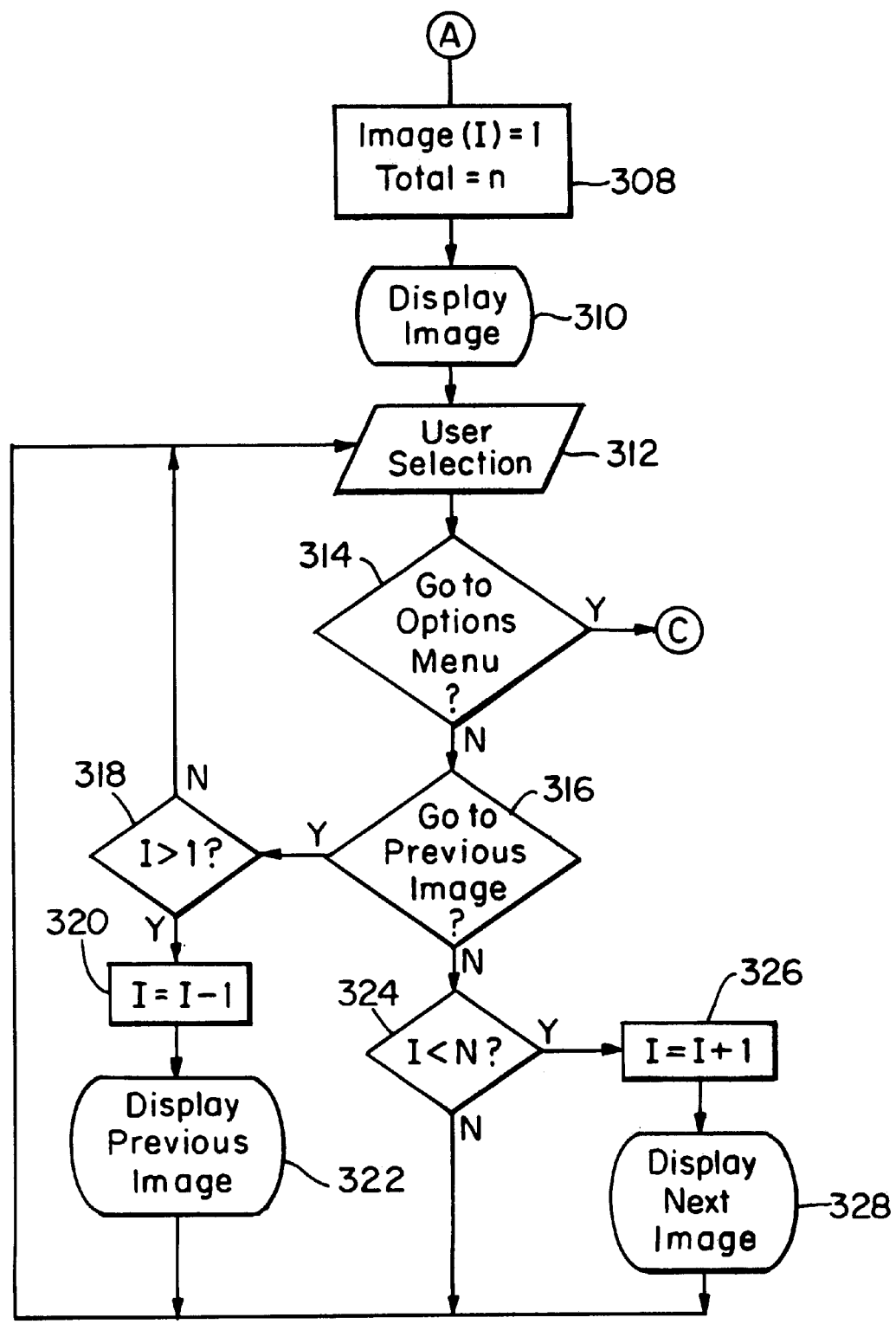
Figure 2E:
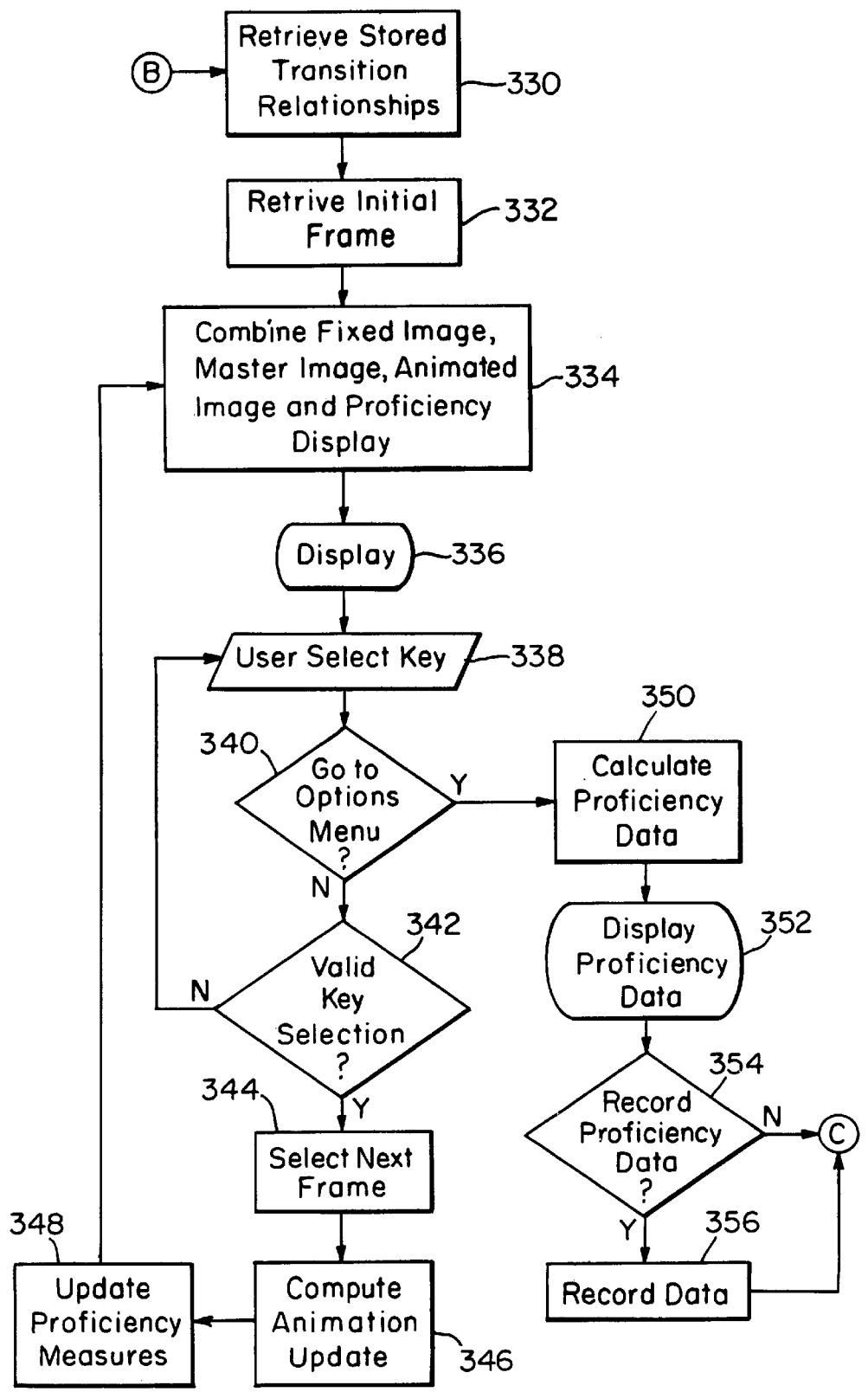
Figure 27:
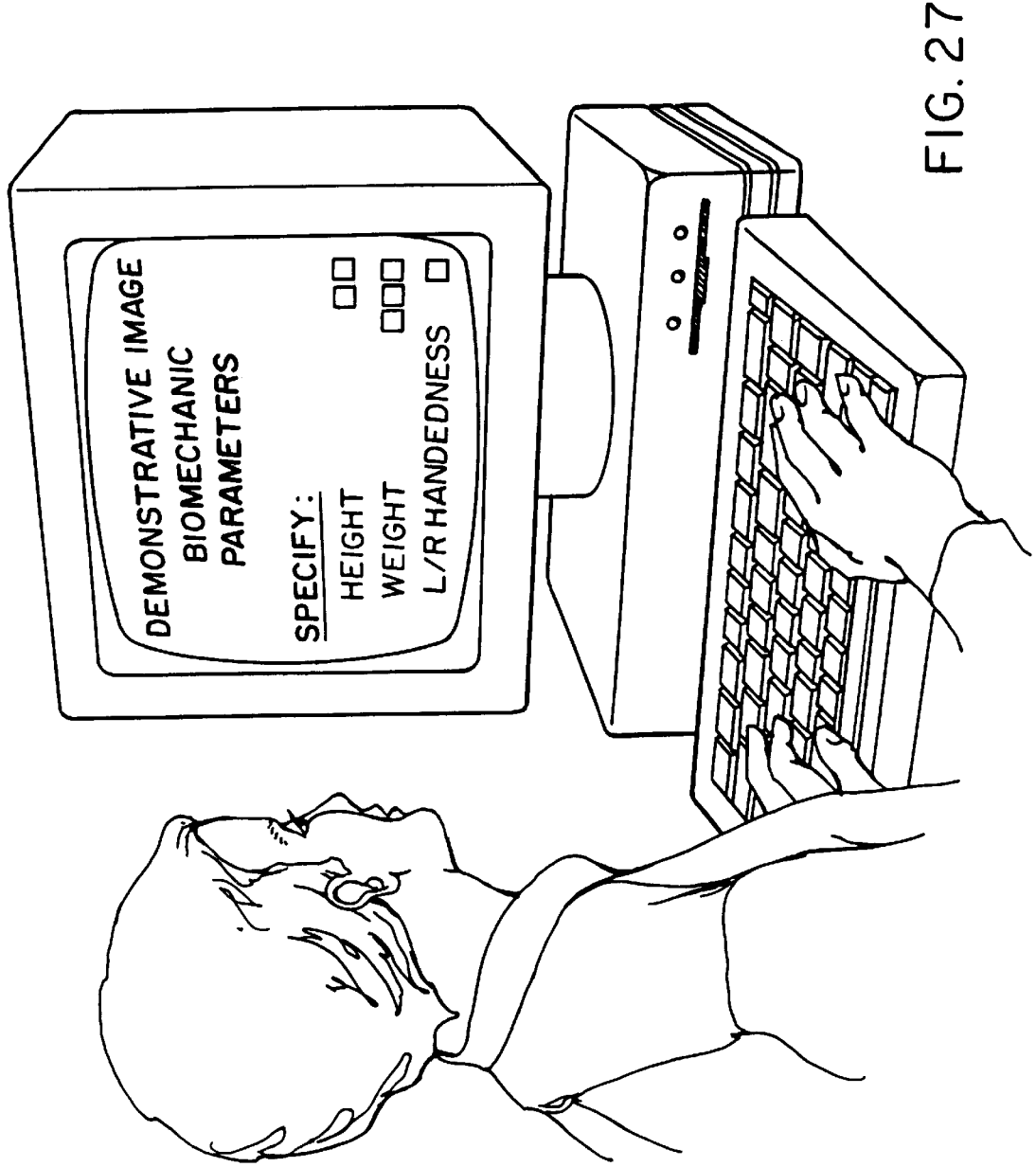
Figure 28:
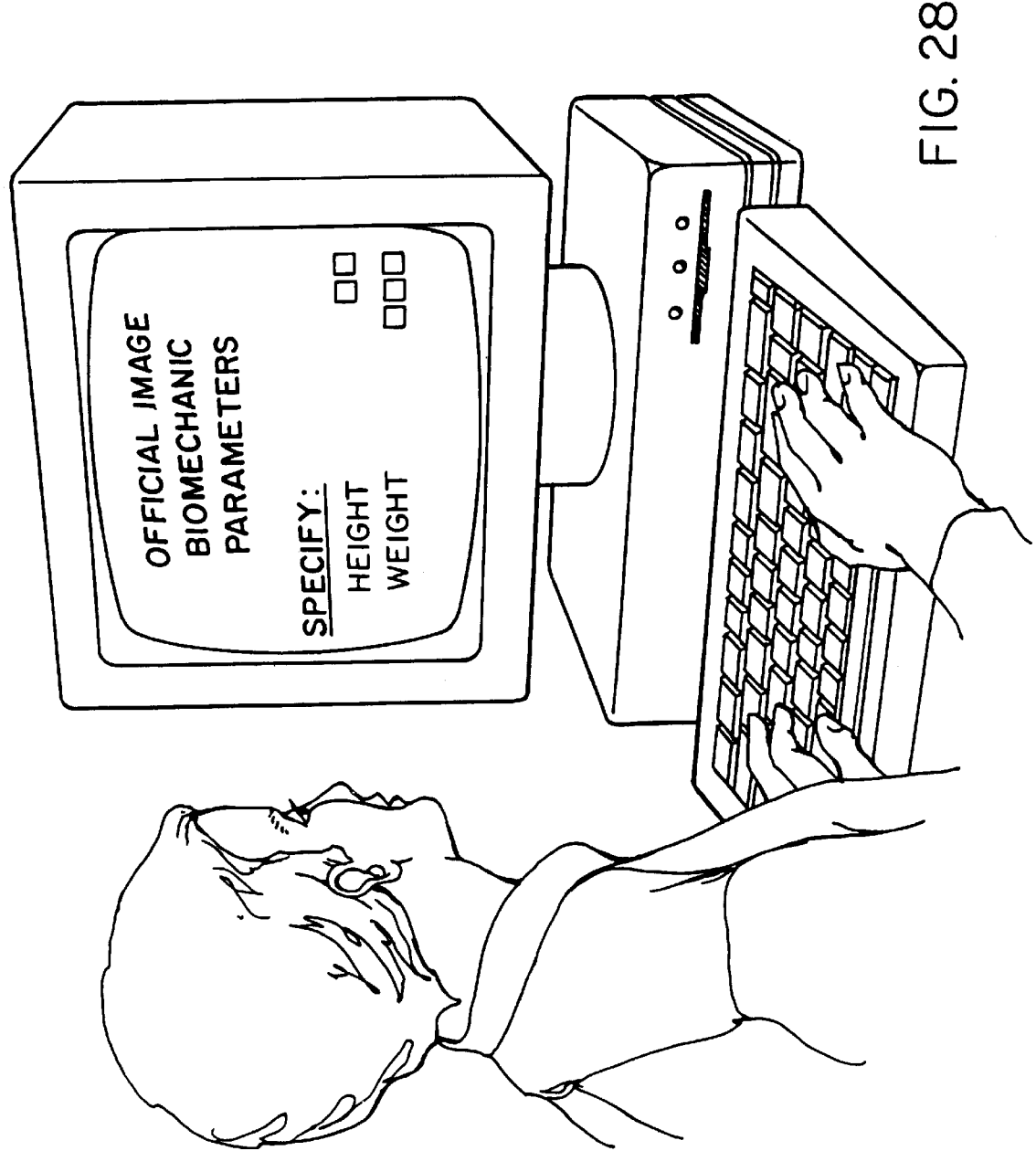

FIGS. 2C through 2E illustrate the logical flow of the system of the present invention that is run by the player/student or user. In block 270 of FIG. 2C, the system displays an opening screen on the computer display which contains a title, logo, and welcome message. In block 272, the computer requests a user identification code (ID) and, in block 274, the player/student enters an ID into the computer via a keyboard, mouse or other user input device. In block 276, the system determines if the user has entered the system before. If the player/student has previously entered the system, information regarding his/her personal characteristics (e.g. name, identification code, weight, height, age, right or left handedness, level of expertise, team name, and coach/instructor's Name (as shown in FIGS. 27 and 28)) as well as his/her performance record can be retrieved from the database in block 278. If the player/student is new to the system, information regarding his/her personal characteristics can be recorded by the system in blocks 280 and 282. If the player/student has entered an invalid ID, the system can return to the input stage via block 274 after informing the user in block 284.

Following the identification process, the player/student is presented with, in block 286, a menu of general categories which describe the skills used in the sport of hockey, e.g.

(1) skating
(2) checking
(3) stickhandling
(4) shooting
(5) offensive play
(6) defensive play
(7) positional play
(8) situational play
(9) tactical play
(10) maneuvers.

In block 288, the player/student selects the number of the category he/she wishes to study and/or practice. If the player/student chooses to press <ESC>, he/she will exit the system in block 290.

For each general category, the computer system stores a list or sub-menu of specific plays, maneuvers or skills which will develop the player/student's skills in the area selected. For example, under the category of skating, he/she may choose from the following options:

(1) dash—forward
(2) dash—backward
(3) start
(4) stop
(5) forward left crossover
(6) forward right crossover
(7) backward left crossover
(8) backward right crossover The sub-menu for the general category selected by the player/student will be displayed in block 292, and the player/student selects the maneuver or skill he/she wishes to study and/or practice in block 294. If the user chooses to press <ESC>, he/she will return via block 296 to the category menu in block 286.

Figure 23:
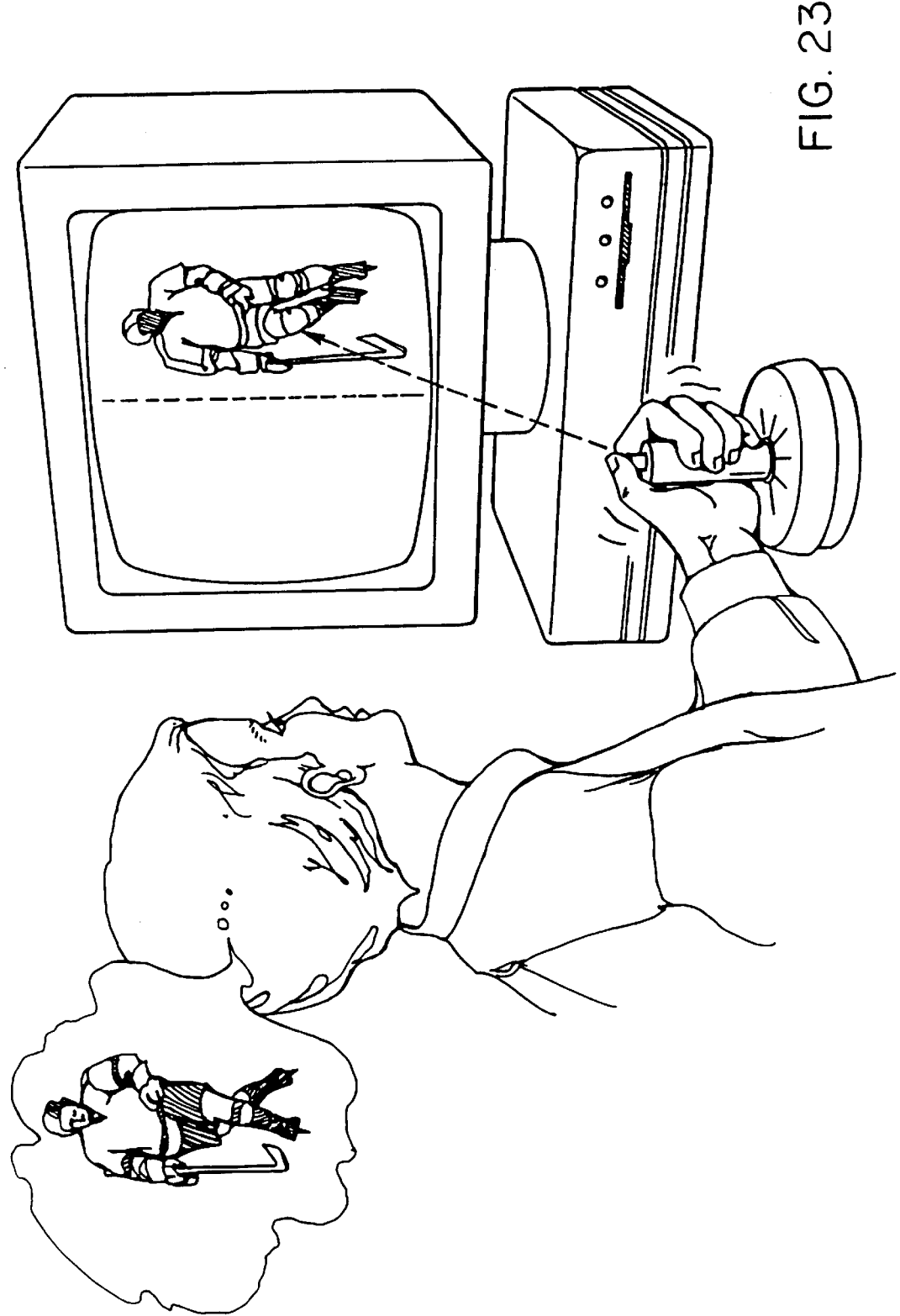
Figure 24:
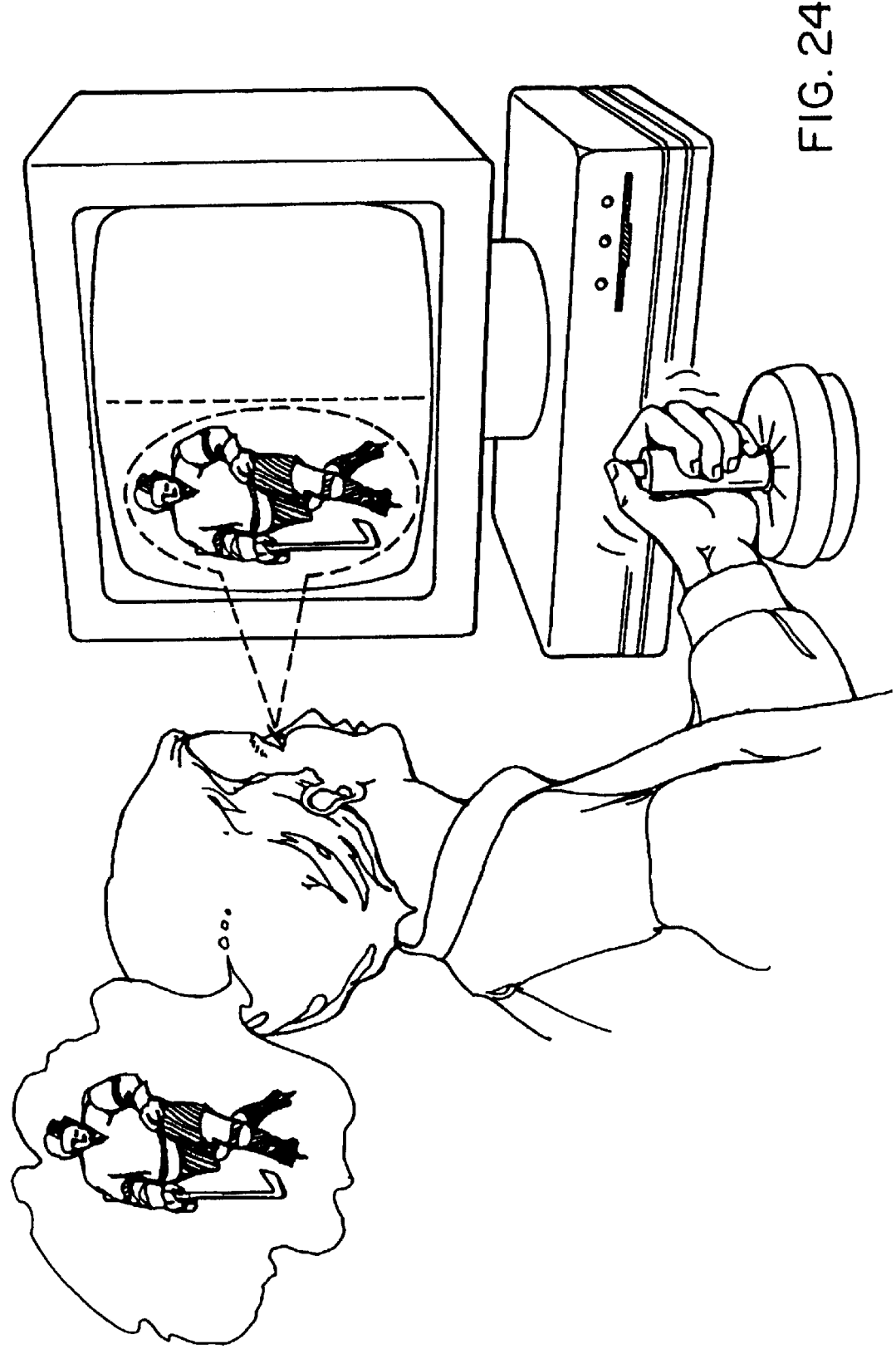
Figure 25:
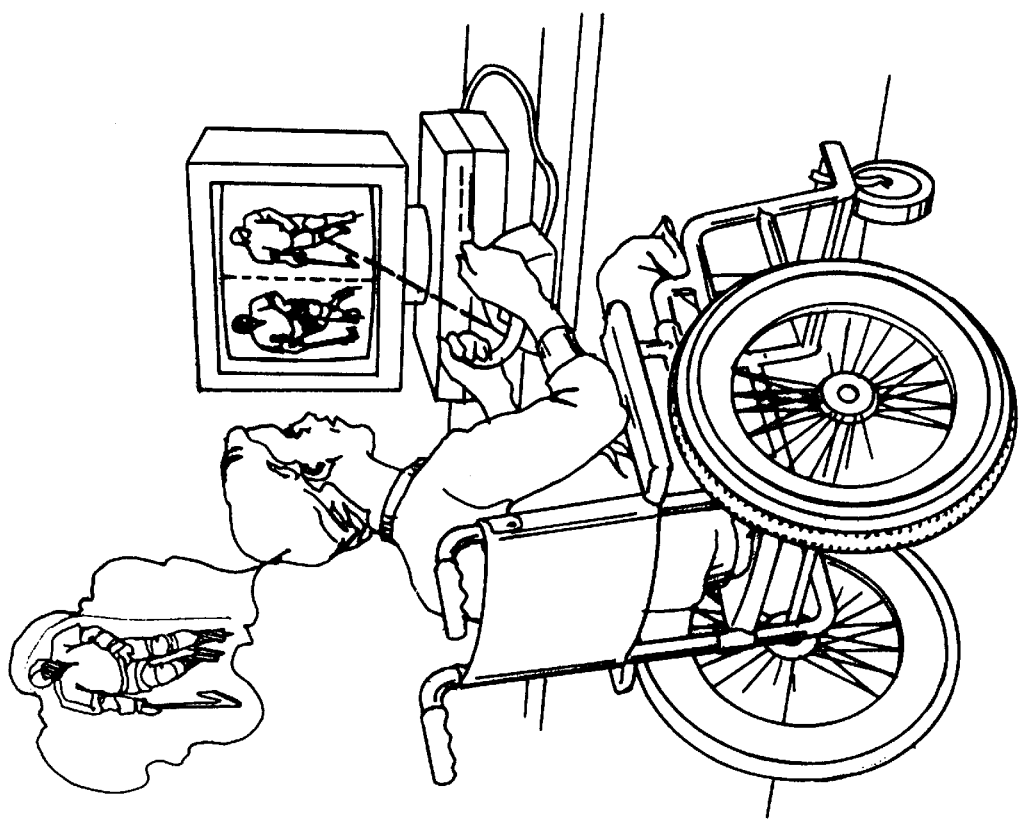
Figure 26:
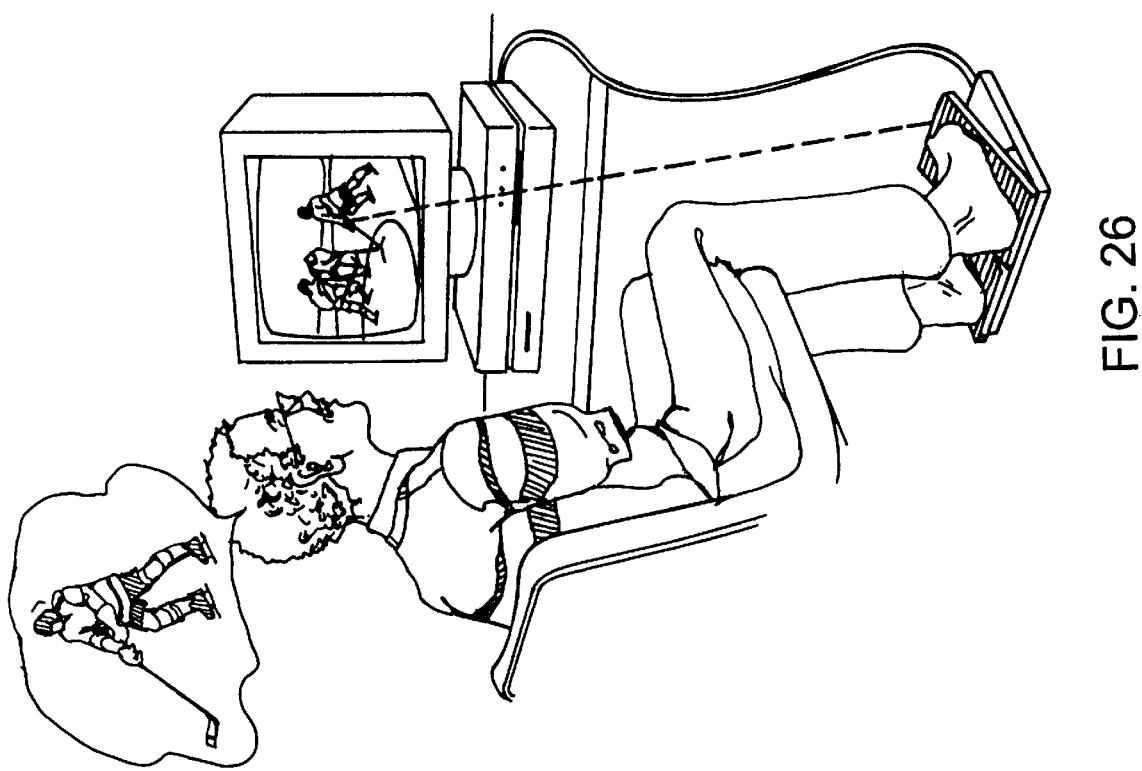

If the player/student opts to study a specific maneuver or skill, the system retrieves the appropriate image sequences from the image database in block 298. An options menu will be displayed in block 300. For each maneuver or skill selected, the player/student can either view the images of the ideal execution of the maneuver and/or interactively practice the maneuver or skill by manipulating via the user input device an adopted image of a hockey player which has been superimposed over or juxtaposed to the ideal image on the displays (as shown in FIGS. 23 and 24). When practicing a skill, the player/student attempts to manipulate the adopted player image to approximate as closely as possible the execution of the skill by the ideal image. The player/student makes this selection from the options menu in block 302. If the player/student chooses in block 302 to press <ESC>, he/she will return to the skill menu block 292 via block 304. If the player/student chooses, in block 306, to view the master or ideal execution of the skill or maneuver, control of the system will pass to FIG. 2D. If the player/student chooses in block 306 to practice the selected skill or maneuver, control passes from block 306 to FIG. 2E.

Referring to FIG. 2D, if the player/student has chosen to view the master or ideal image, in blocks 308 and 310 the player/student begins with the first image in the sequence. If the player/student chooses in block 312 to press, ESC., the system will return via block 314 to the options menu in block 300 (see FIG. 2C).

If the player/student chooses in block 316 to view the previous frame in the sequence, the system checks in block 318 to insure that a previous image exits, i.e., that the player/student is not currently viewing the first image in the sequence. If a previous frame exists, the system selects and displays the appropriate image in blocks 320 and 322.

If the player/student chooses in block 316 to view the next frame in the sequence, the system checks in block 324 to insure that a subsequent image exists, i.e., that the player/student is not currently viewing the last image in the sequence. If a subsequent frame exists, the system selects and displays the appropriate image in blocks 326 and 328.

Referring back to FIG. 2C, as mentioned above, if the player/student chooses in block 306 to practice the selected skill or maneuver, control passes to FIG. 2E. Referring to FIG. 2E, in block 330, the decision tree which describes the relationships between the drawings in the player/student controlled image sequence is retrieved. In block 332, the first image which will be displayed on the computer screen is determined and retrieved. In blocks 334 and 336, the first image in the master sequence, the first image in the player/student controlled sequence, the fixed image (or background), and the proficiency display graphics are combined and displayed.

In block 338, the player/student may exit to the options menu via block, 340 or select a computer key (or other input device, e.g. mouse, joystick) which will move the controlled image. If the player/student selects an invalid key, the system will give the player/student the option of selecting another key in block 342.

If the player/student selects a key to manipulate the controlled image, the next frame in the sequence will be selected in block 344. The controlled image will be updated in block 346 and proficiency measurements will be calculated in block 348. The system will then return to block 334 where the images will be combined and displayed.

While practicing the skill or maneuver, the player/student receives visual feedback by studying on the computer screen (monitor) how closely the adopted image approximates the ideal image. In addition, proficiency measurements are calculated and displayed on the computer screen together with the master and controlled images. The proficiency measurements can be continuously updated as the player/student proceeds through the practice session.

If the player/student chooses in block 340 to return to the options menu, the system can calculate a numeric score or scores in block 350 which will represent how close the player/student came to approximating the ideal image. If applicable, the system can compare current results to those retrieved from the player/student's records. This will enable him/her to monitor his/her progress in perfecting the particular skill being studied. This information will be displayed on the computer screen in block 352.

If the player/student chooses in block 354 to count the practice session as a "warm-up", the current score will not be recorded in the player/student's record. Otherwise, the player/student's current performance will be recorded in block 356 by the computer for future reference. Control of the system then returns to FIG. 2C.

In a further embodiment of the invention, the player/student has the option of controlling the adopted image of one or more hockey players against an opposing team in the context of a game (this embodiment of the invention can be used for practice sessions or drills). The opposing team may consist of one to five ideal players (plus one goaltender) that are controlled by the computer system.

Figure 13:
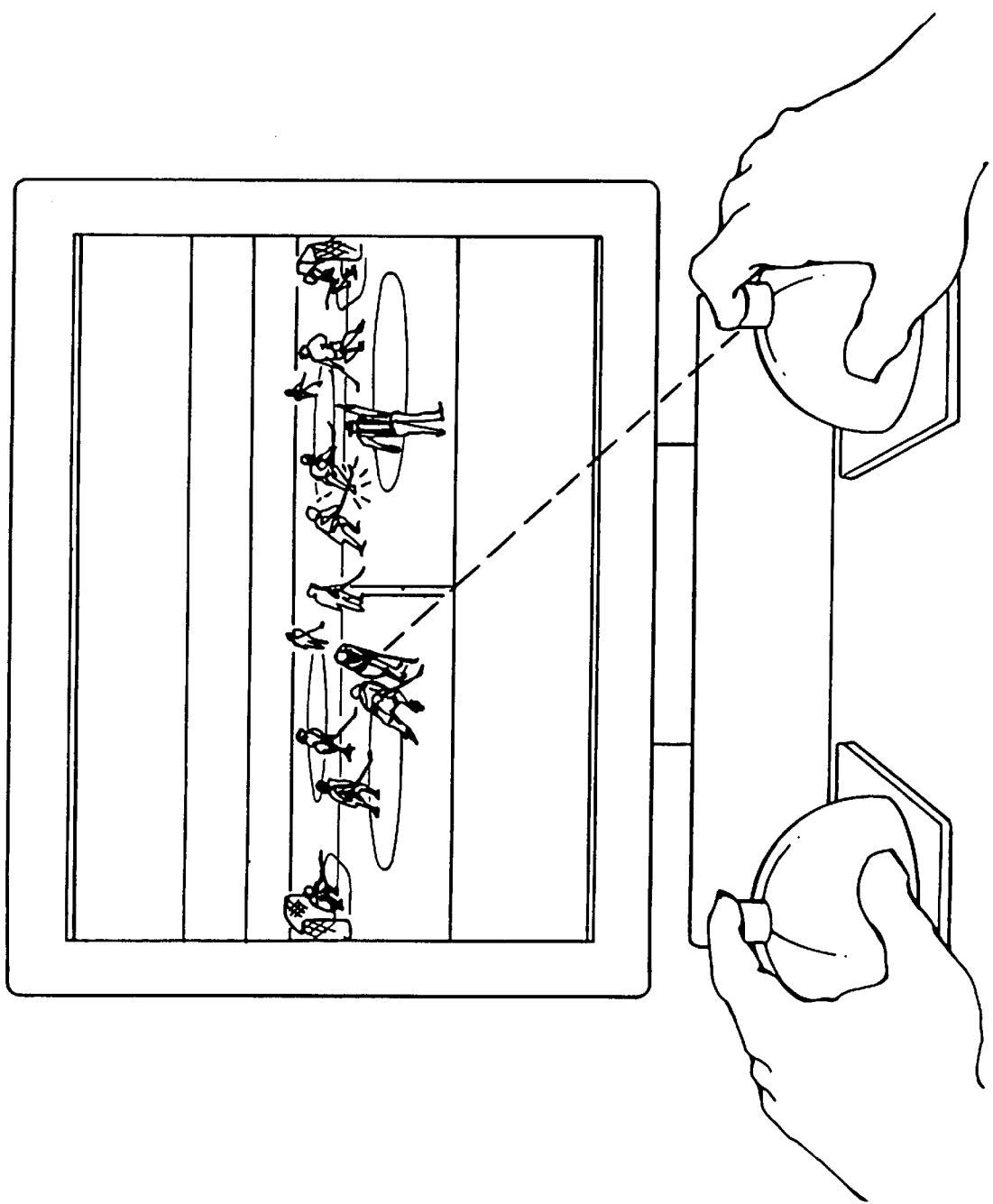
Figure 15:
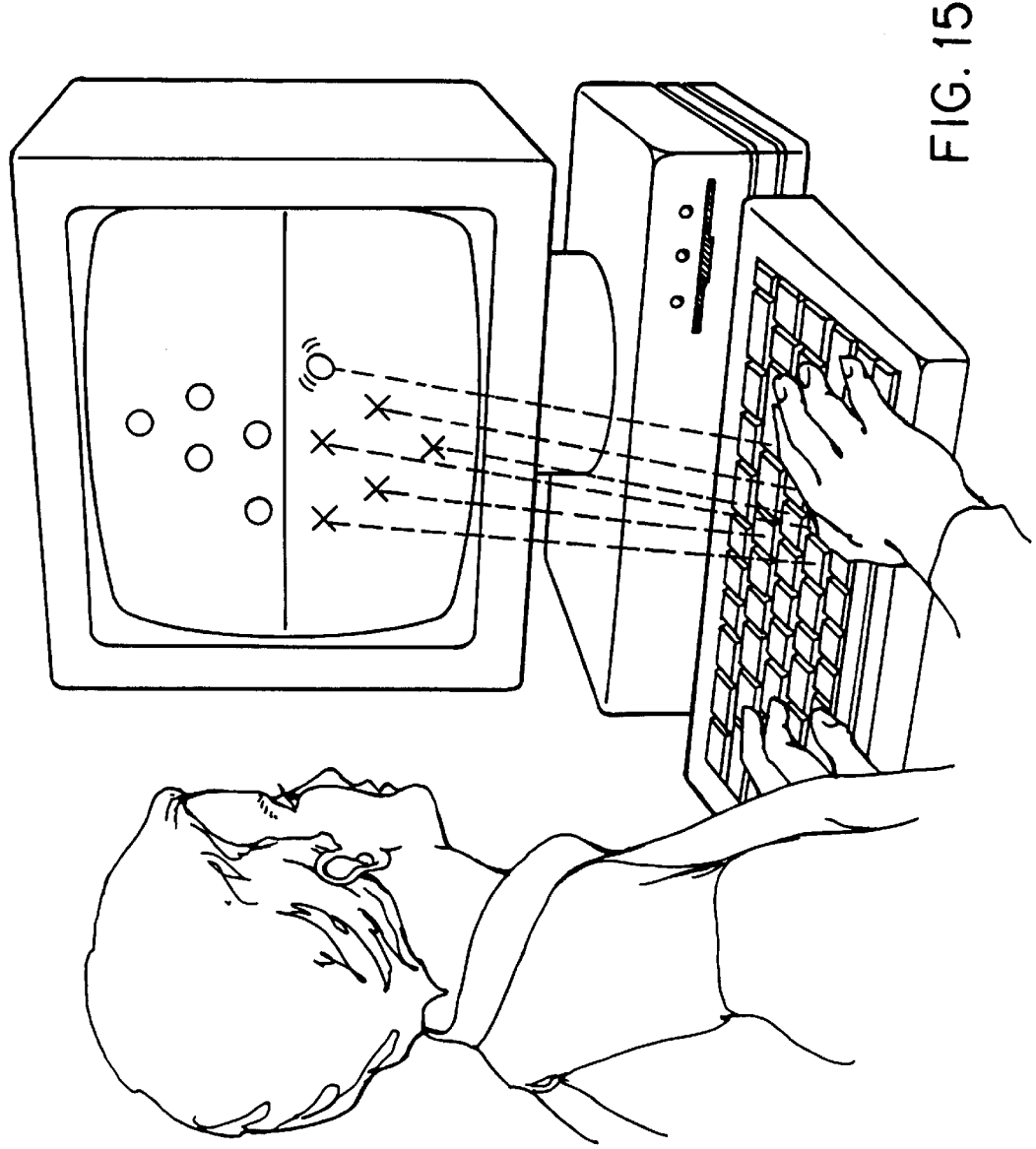
Figure 18:
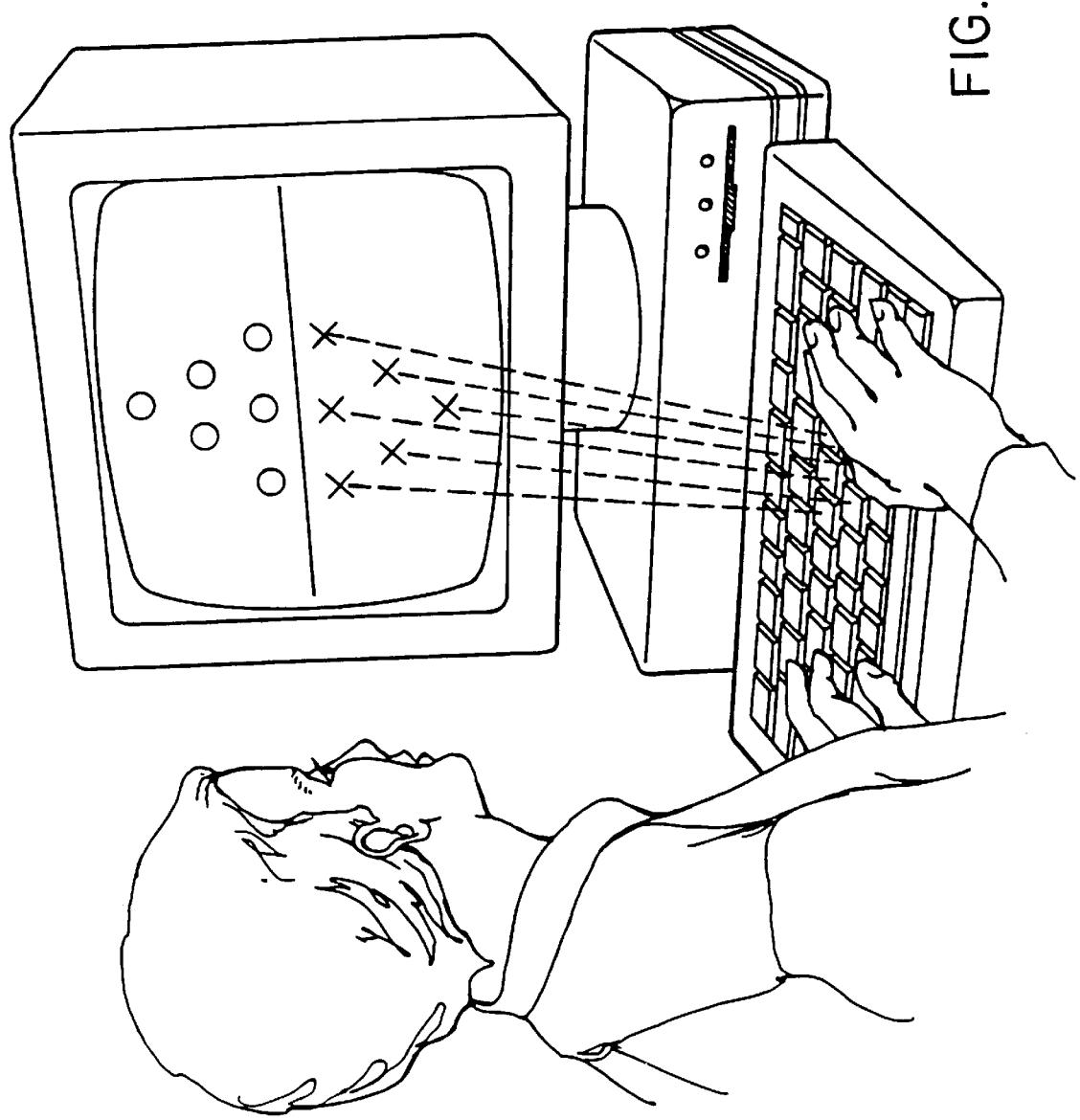

The player/student can select the number of players (one to six including goaltender) on the opposing team from a menu screens (as shown in FIGS. 15 and 18). In addition, the player/student has the option of choosing whether the opposing team is in an offensive or defensive posture (as shown in FIG. 13).

Figure 14:
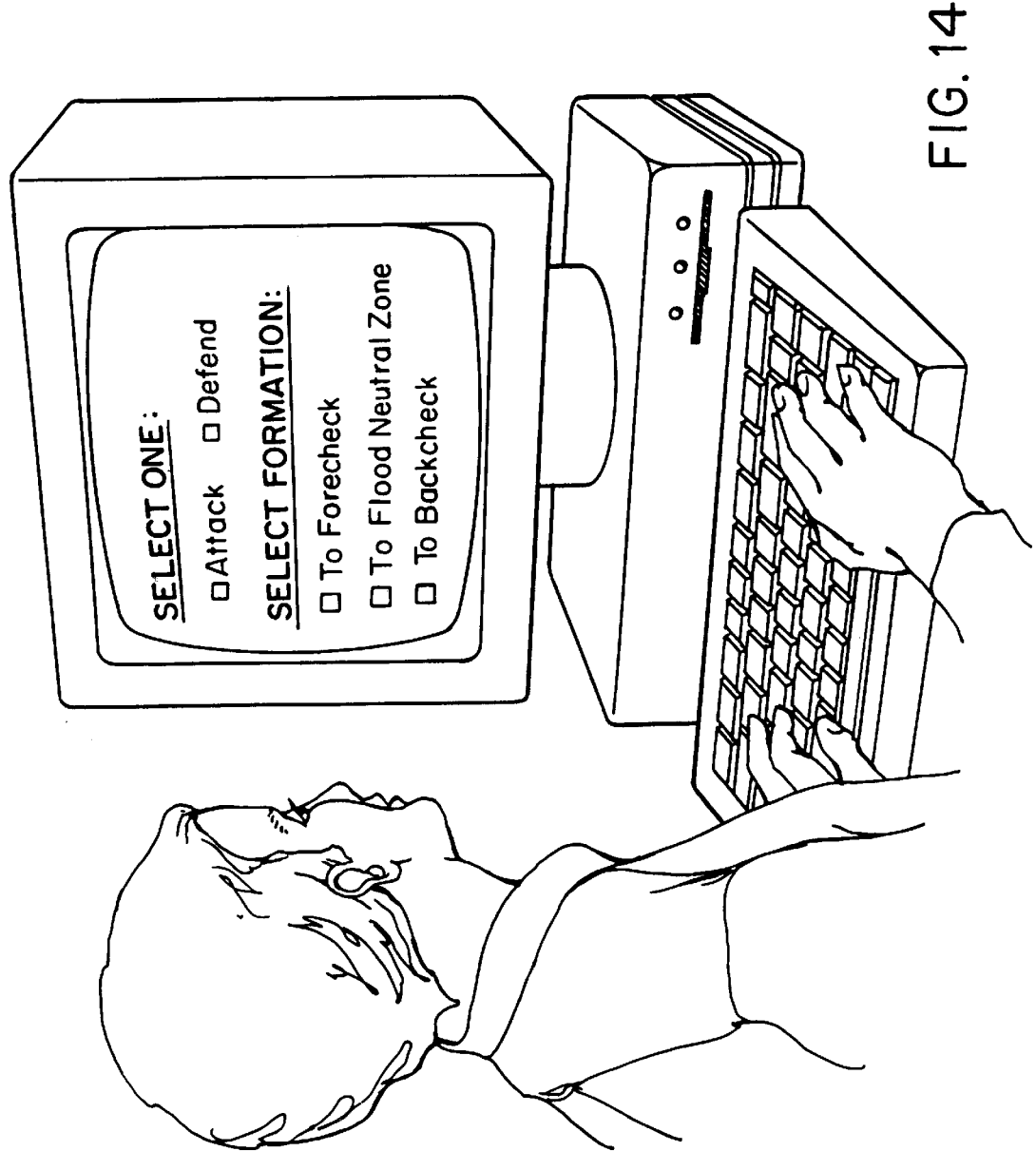

The player/student can then choose from a list of attacking or defending formations for the opposing team. The list of formations can vary with the number of players on the opposing team, it being obvious that a full team of six (5 skaters and one goalie) will offer the maximum number of formations (as shown in FIG. 14).

The game can be played with the player/student causing the movement of the adopted image(s) to "play" against the ideal team which is pre-controlled by the computer software. The rules of the game will be those generally used in competitive hockey, i.e. by most American, Canadian, and international teams. Games can last from 10 to 45 minutes (more or less) depending on the delivery system being used, e.g. tutorial/interactive, coaching, arcade, home, etc.

Additional embodiments of the invention enable the player/student to play against an opposing team when his/her adopted image is part of an adopted team. Each team may consist of ideal (computer controlled) images or adopted images controlled by other player/students on additional terminals connected to the system or networked together. Each team may consist of one to five players (plus goalies), with fewer players for roller hockey; and more or less for other sports or activities.

FIGS. 3 through 8 are schematic pictorial illustrations of use of the various embodiments and configurations of the present invention.

Figure 3:
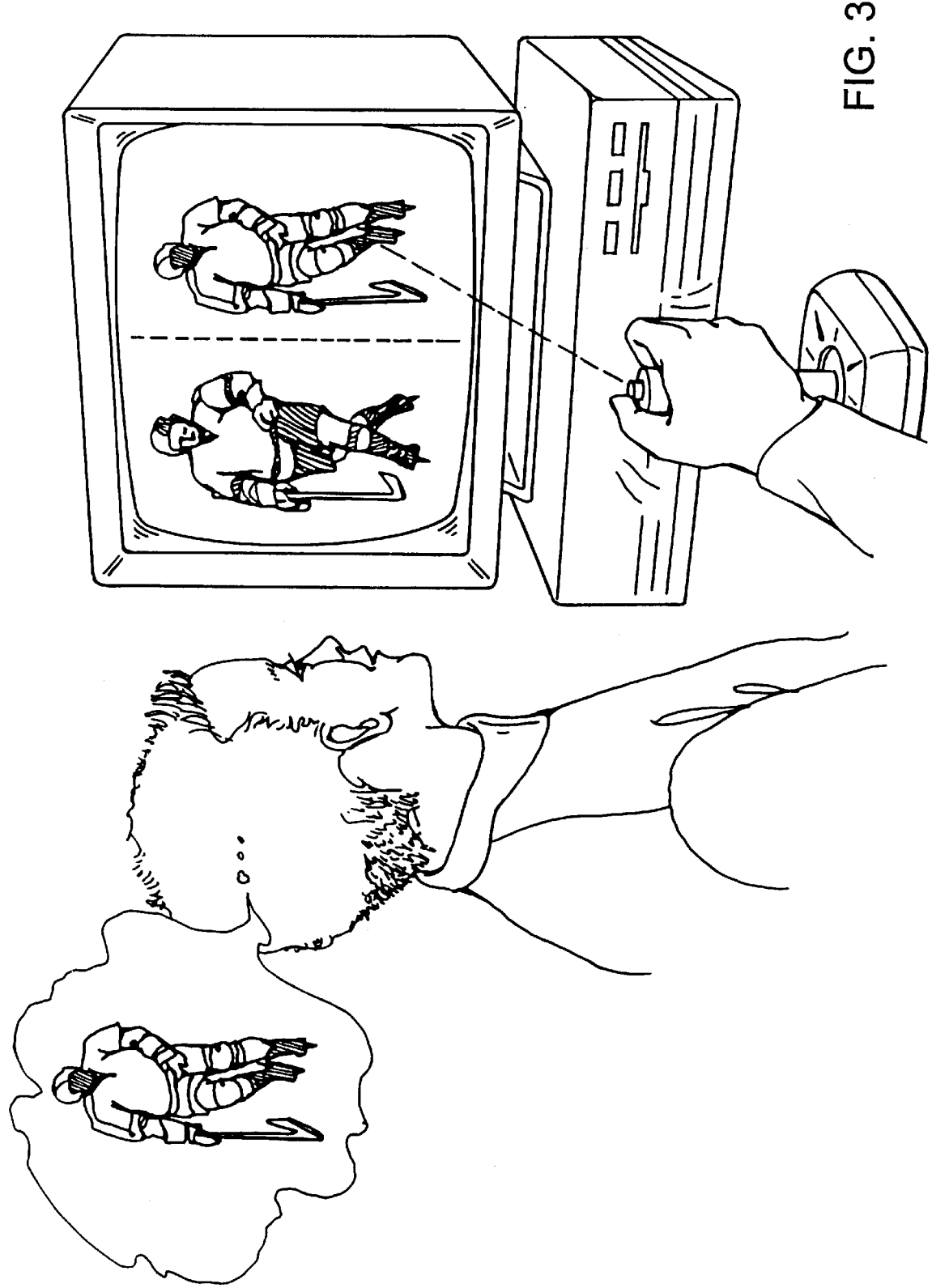
FIG. 3 is a pictorial diagram of a user interacting with one embodiment of the invention.

FIG. 3 shows a single user using the invention. The user supplies inputs via a hand-held joystick to manipulate an adopted figure on the right side of the screen to approximate movement of an image of an instructive, preprogrammed figure on the left side of the screen. The user views the preprogrammed image, recognizes what is being demonstrated, visualizes the performance of the maneuver, makes cognitive choices and decisions (including considering options) then manipulates the controllable, adopted image on the right side of the screen to achieve the instructed desired result.

Figure 4:
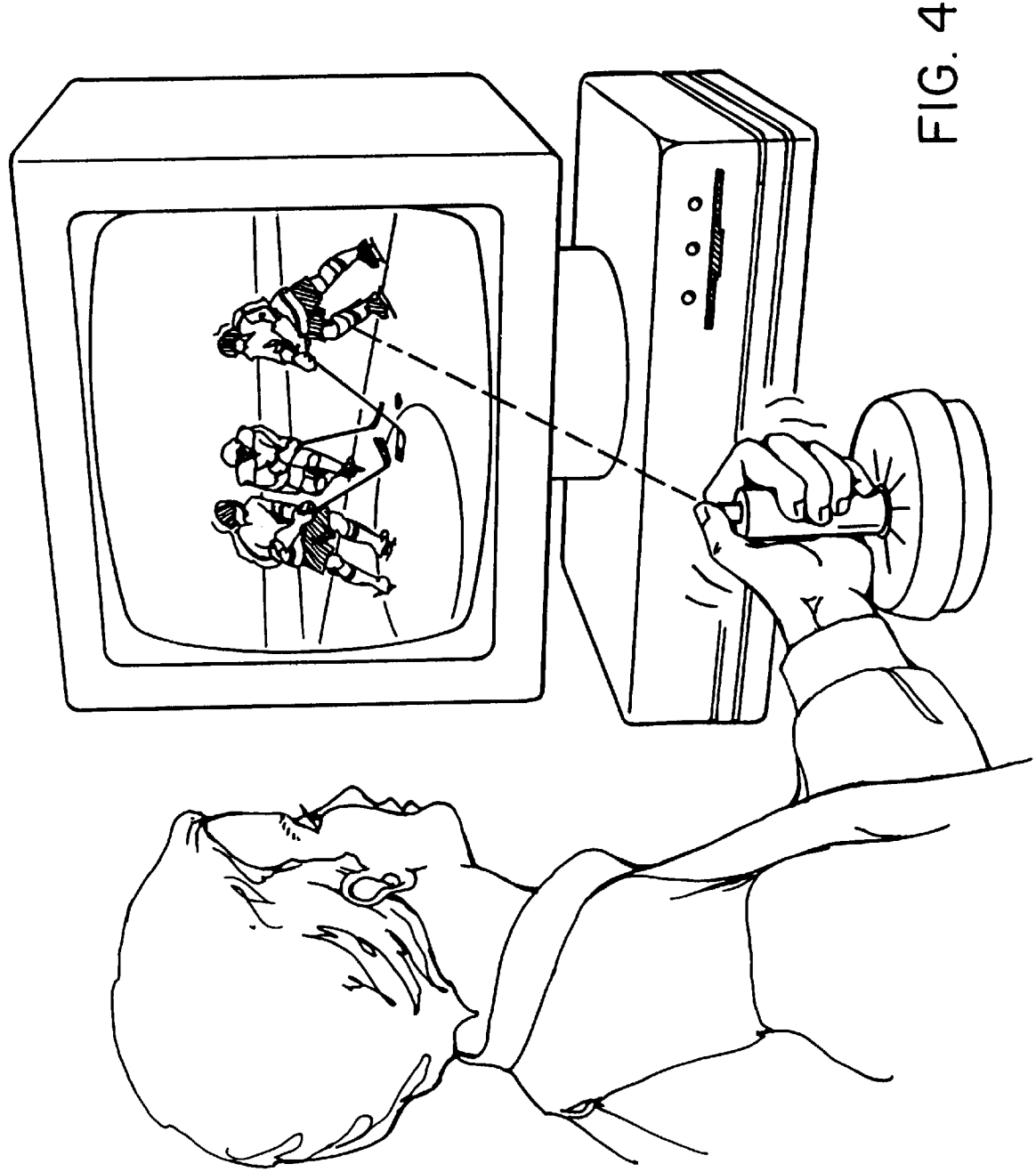
FIG. 4 is a pictorial diagram of a user interacting with an alternative embodiment of the invention.

FIG. 4 shows another single user interfacing with the computer system of the invention. In this embodiment, the user, in a competitive setting, manipulates the controllable image (shown connected to the joystick controller by a dashed line) to effect a result or accomplish an objective playing in opposition to two preprogrammed images. It will be understood that the number of preprogrammed and controllable images can be different than those depicted in FIG. 4.

FIGS. 5A and 5B show two users using the invention simultaneously on two different computers which are networked together. In this configuration, two instructive images on the left side of the screen are approximated by two adopted, controllable images on the right side of the screen. The first user (FIG. 5A) manipulates one of the adopted figures to emulate a repositioning movement of one of the instructive figures, and the second user (FIG. 5B) manipulates the other adopted figure to emulate the repositioning of the other instructive figure.

Figure 6:
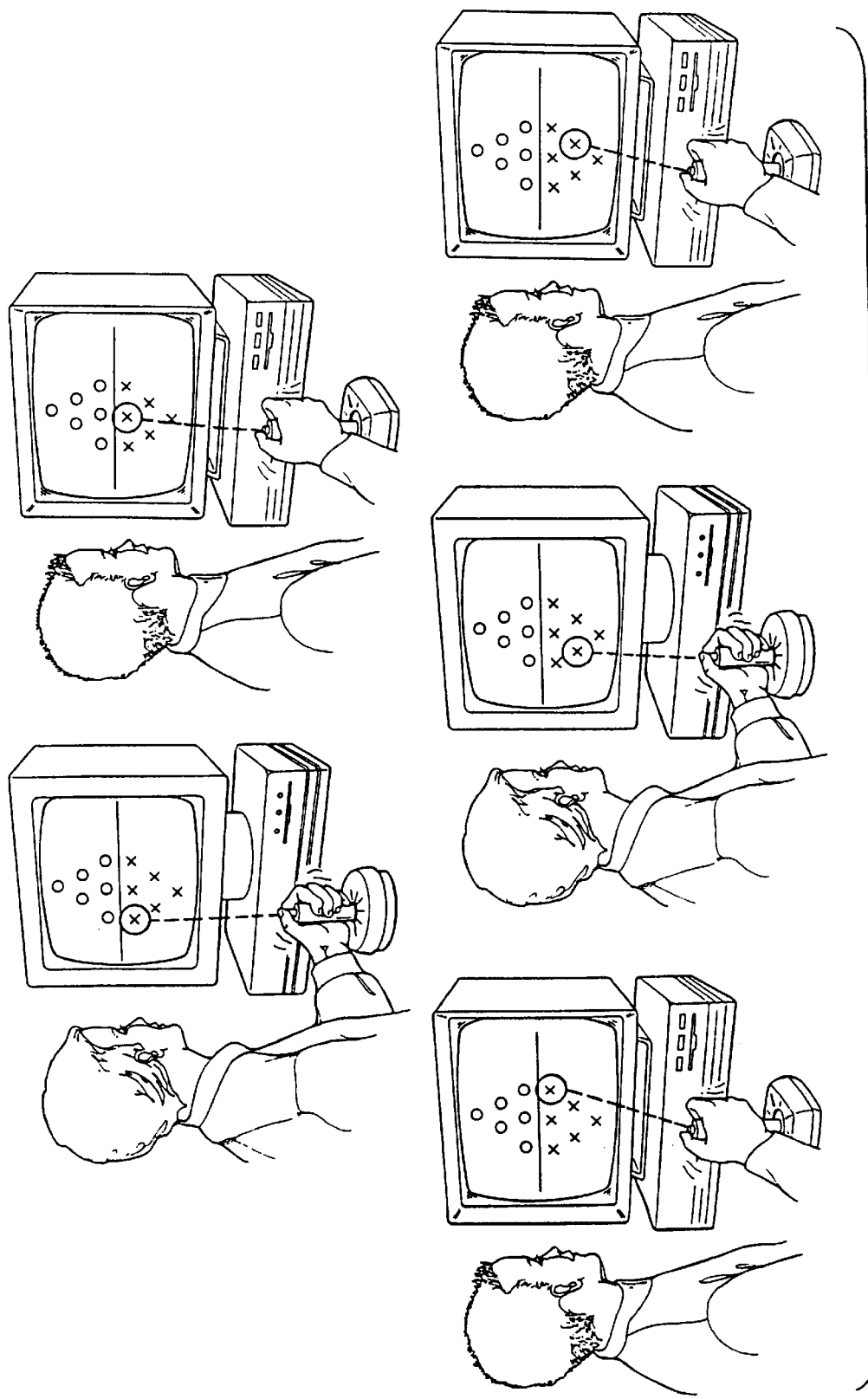
FIG. 6 is a pictorial diagram of multiple users interacting with another alternative embodiment of the invention.

FIG. 6 shows multiple users simultaneously interfacing with the method and apparatus of the invention on multiple networked computers. In this configuration, multiple users manipulate controllable images in a team setting against a preprogrammed team, with each user controlling one of the five controllable figures. Alternatively, the system can be used such that the opposing team is also comprised of controllable images.

Figure 7:
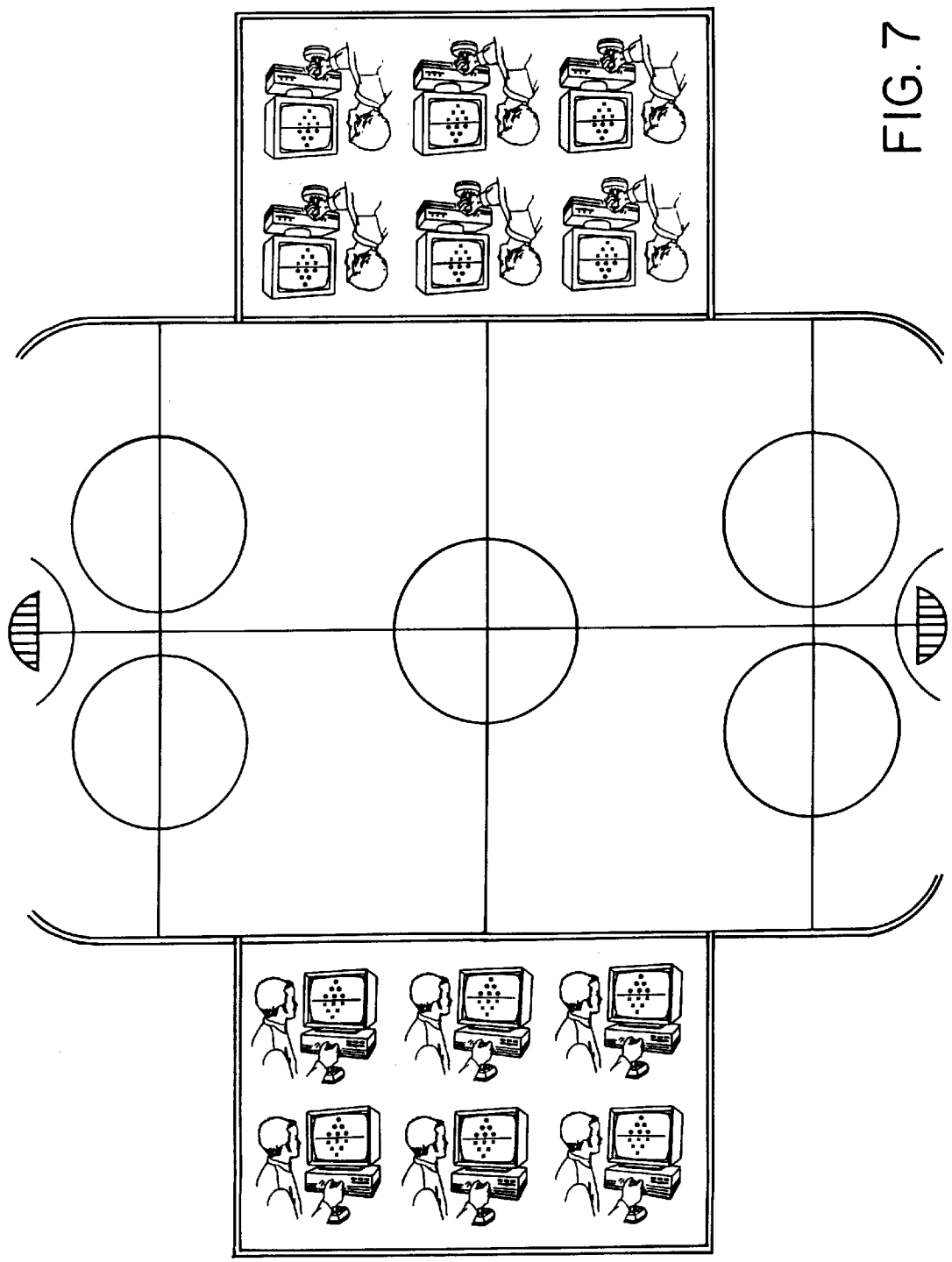
FIG. 7 is a pictorial diagram of multiple users interacting with another alternative embodiment of the invention.

FIG. 7 is a pictorial view showing multiple users interfacing with the invention. Again, the individual computers are networked such that all of the users can interface with the invention simultaneously. In this embodiment, the system is installed in a skating rink setting such that it is conducive to practice and training. The skating rink can be of the type described in co-pending U.S. patent application Ser. No. 08/375,606, filed Jan. 20, 1995, entitled "Interactive Ice and Roller Hockey Training Coaching and Playing Rinks," by Vincent J. Macri, which is incorporated herein by reference.

Figure 8:
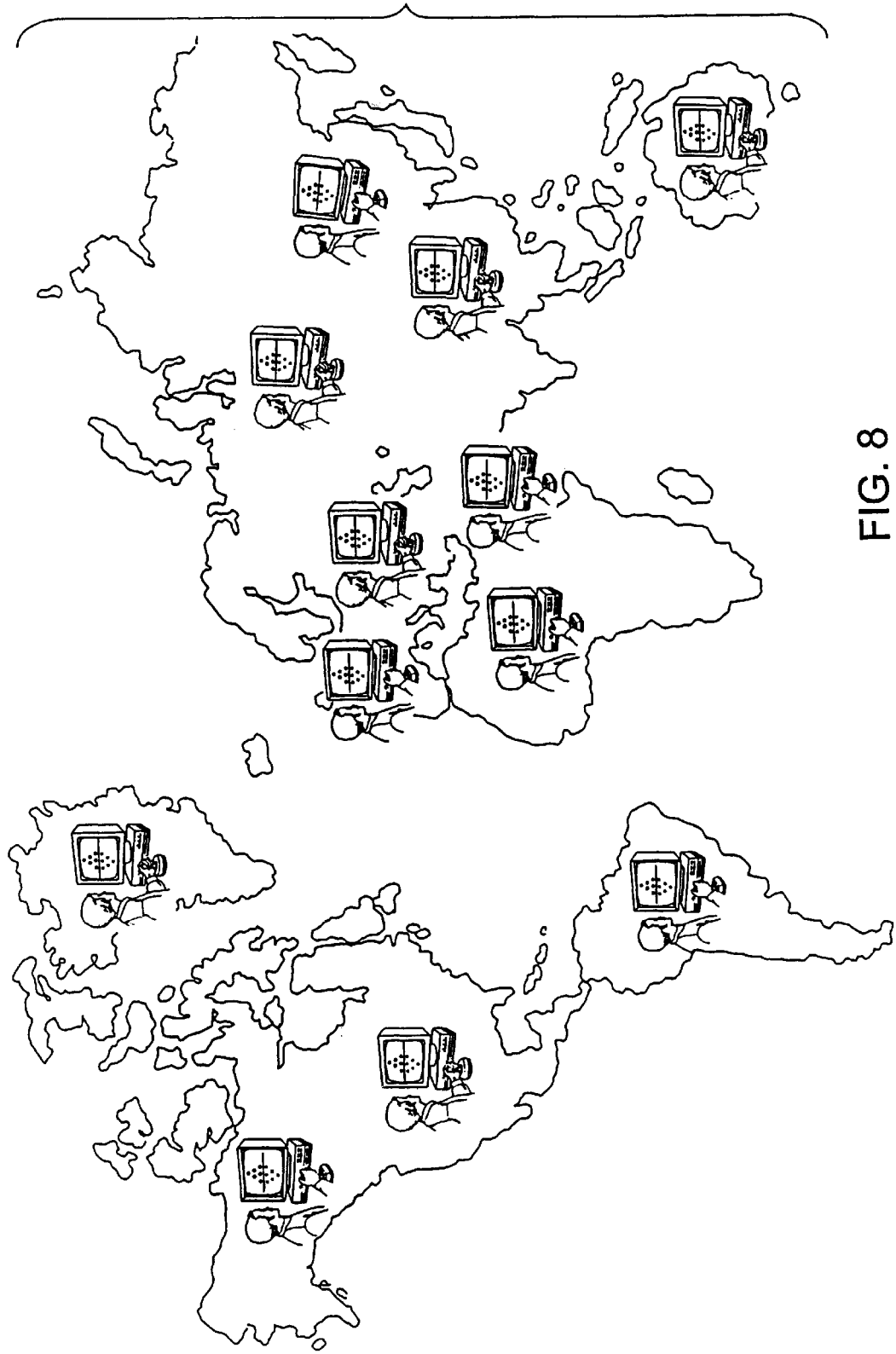
FIG. 8 is a schematic pictorial diagram of another alternative embodiment of the invention used in conjunction with the worldwide Internet.

FIG. 8 is a schematic pictorial depiction of the invention being used by multiple users simultaneously with the systems being connected over the worldwide Internet. This configuration allows users remotely located from each other to simultaneously interface with the invention and with one another.

While this invention has been particularly shown and described with references to preferred embodiments thereof, it will be understood by those skilled in the art that various changes in form and details may be made therein without departing from the spirit and scope of the invention as defined by the appended claims.

The foregoing describes the use of the system of the present invention for cognitive instruction, simulation, pre-training and practice and entertainment in the sport of ice hockey. However, as will be recognized by those of ordinary skill in the art, the system of the present invention may be utilized for other sports or athletic training, including, but not limited to, street hockey, roller hockey, field hockey, figure skating, soccer, football, baseball, etc., or instruction in other non-sport activities. For example, for sports the system of the present invention may be utilized in an instructional program for soccer by storing images of ideal soccer plays and allowing the player/student to control an image of a soccer player in the manner described previously for ice hockey. For non-sport activities, such as bricklaying, diamond cutting etc., calling for the coupling of cognitive and motor skills the present invention is well-suited.

Figure 21:
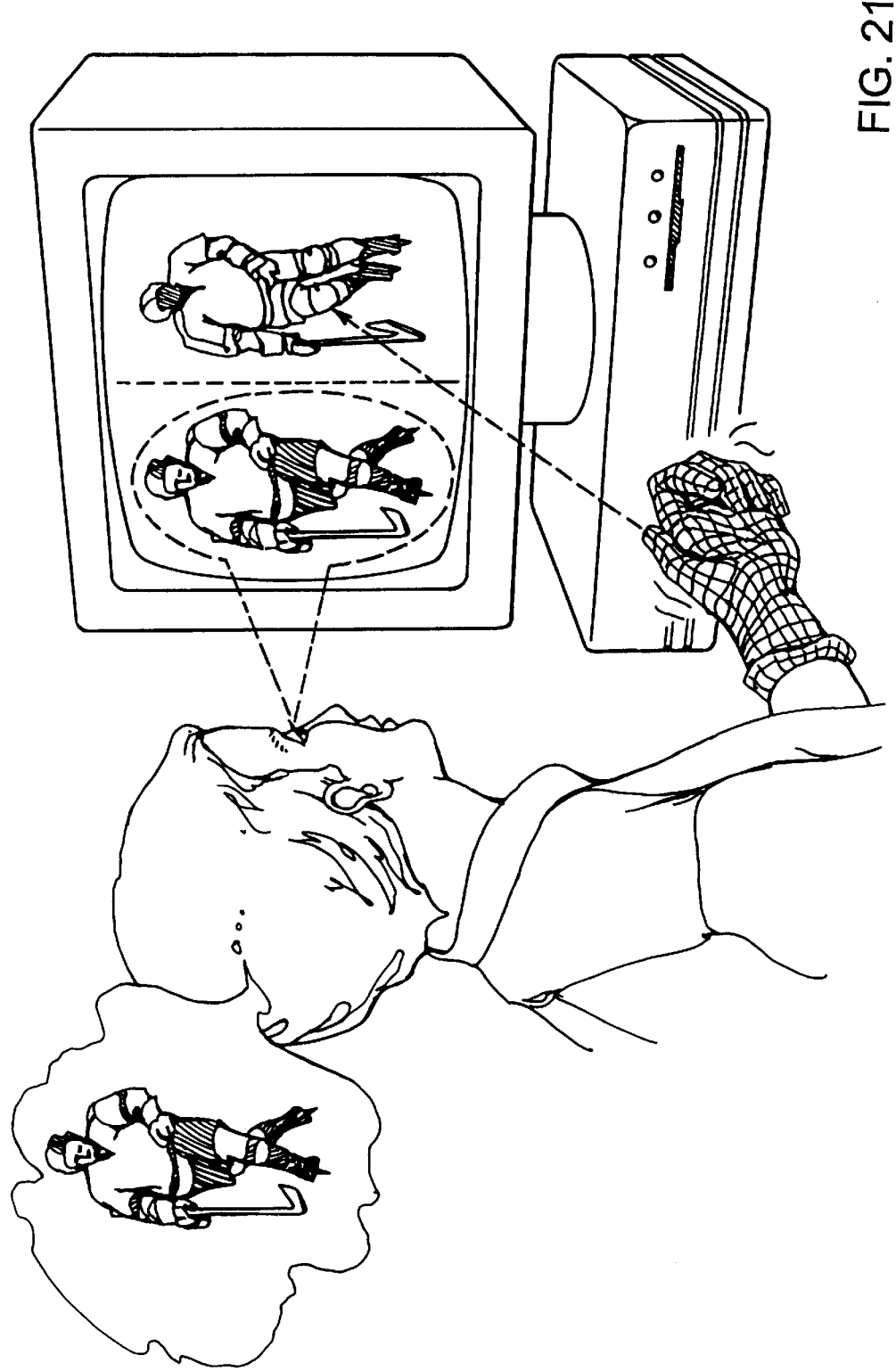
Figure 22:

It will also be apparent to those skilled in the art that the scope of the present invention need not be limited to the technology described above. For example, the method used by the player/student to manipulate the "controlled" image may be changed to include a joystick, 3D controller for PC games such as SpaceOrb 360, virtual reality gloves (as shown in FIG. 21), helmet and states, foot pedals or other technology and the "adopted" and "instructive" images may appear on a virtual reality headset (as shown in FIG. 22) or other virtual reality device(s). The method of obtaining, storing, and displaying the "controlled" and "instructive" images may also be changed to include video, multi-media, or animation methods. All or any portion of a controllable figure can be displayed from any perspective.

What is claimed is:

1. A method of simulated training for at least one user interacting with at least one image displayed on a display means of a processing system, said method comprising the steps of:

generating and storing in a memory means of the processing system, at least one processor displayed sequence of demonstrative images, wherein said at least one processor displayed sequence of demonstrative images comprises a series of images of demonstrative performance of physical activity movements;

further generating and storing, in said memory means, at least one processor displayed user controllable image, wherein said at least one processor displayed user controllable image comprises a user controllable image idiosyncratically controlled by said user to perform a series of simulated physical activity movements idiosyncratic interactive with said sequence of demonstrative images;

displaying an image of said sequence of demonstrative images on the display means of said processing system;

further displaying said user controllable image on said display means of said processing system, providing said at least one user with input means of said processing system to transmit inputs to said processing system for idiosyncratically controlling said user controllable image, such that instead of said at least one user performing said interactive movements, said user controllable image is controlled to perform said simulated physical activity movements idiosyncratically interactive with said displayed image of said sequence of demonstrative images;

storing, and maintaining in said memory means, a record of said movements representing said user controllable image as controlled by said input means such that said record is modified to represent said idiosyncratic movements as controlled by said input means; and displaying said movements of said user controllable image on said display means in sequence with said displayed image of said sequence of demonstrative images.

2. The method of claim 1 further comprising the step of providing means, to said at least one user, to select from examples of said demonstrative physical activity movements.

3. The method of claim 1 further comprising the step of providing means to receive inputs from said at least one user to select the speed at which said series of images of demonstrative performance of said movements is displayed.

4. The method of claim 1 further comprising the step of providing means to coordinate the speed of use of said input controls from said at least one user with the speed at which said series of images of user controllable movements is displayed.

5. The method of claim 1 further comprising the step of providing means to receive inputs from said at least one user to control the speed at which the user controllable image is caused to move.

6. The method of claim 1, wherein said user controllable image is displayed in a region of said display means that is adjacent to another region of said display means at which said series of images of demonstrative movements is displayed.

7. The method of claim 1, wherein said user controllable image is superimposed upon the series of images of said demonstrative movements.

8. The method of claim 1 further comprising the step of providing means to receive inputs from said at least one user to control the direction of movement of said user controllable image.

9. The method of claim 1 further comprising the step of receiving input from said at least one user to control the location of said user controllable image.

10. The method of claim 1 further comprising the step of receiving input from said at least one user to control the locomotion of said user controllable image.

11. The method of claim 1 further comprising the step of providing means to receive inputs from said at least one user to control the posture of said user controllable image.

12. The method of claim 1 further comprising the step of providing means to receive inputs from said at least one said user to control the distance between said at least one user controllable image and at least one other user controllable image.

13. The method of claim 1 further comprising the step of providing means to receive inputs from said at least one user to control at least one item used in said simulated physical movement activity by said at least one user controllable image.

14. The method of claim 1, wherein said series of simulated physical activity movements comprises a maneuver of said movements.

15. The method of claim 1, wherein said input means comprises a virtual reality input device.

16. The method of claim 1, wherein said display means comprises a virtual reality display device.

17. The method of claim 1, wherein said series of images of demonstrative performance of said movements comprises a first maneuver; and said input means provides input, by at least one said user, to control at least one said user controllable image to move in performance of a second maneuver to interact with the first maneuver.

18. The method of claim 17, wherein said series of images of demonstrative performance of said movements comprises a first maneuver; and said input means provides input, by at least one said user, to control at least one said user controllable image to move in performance of a second maneuver in opposition to the first maneuver.

19. The method of claim 17, wherein said series of images of demonstrative performance of said movements comprises a first maneuver; and said input means provides input, by at least one said user, to control at least one said user controllable image to move in performance of a second maneuver in cooperation with the first maneuver.

20. The method of claim 1, wherein said user controls movement of said at least one user controllable image to substantially respond to the movements of said displayed series of images of demonstrative performance of said movements.

21. The method of claim 1 further comprising the step of displaying visible communications to said at least one user.

22. The method of claim 1 further comprising the step of emitting audible communications to said at least one user.

23. The method of claim 1 further comprising the step of providing alphanumeric communications to said at least one user.

24. The method of claim 1, wherein said at least one user further controls at least one additional user controllable image.

25. The method of claim 1 further comprising at least one additional remotely located user to control at least one additional user controllable image.

26. The method of claim 1, wherein said series of simulated physical activity movements comprises simulated training for at least one of real physical movements and unreal physical movements.

27. The method of claim 1, wherein said at least one user selects to substantially suspend from being displayed said displayed image of said sequence of demonstrative images.

28. The method of claim 1, wherein said at least one user selects to substantially suspend from being displayed said displayed image of said user controllable image.

29. The method of claim 1, wherein said at least one user selects to substantially suspend said inputs to said processing system.

30. The method of claim 1, wherein the displayed image of said user controllable image is modified according to user specifications.

31. The method of claim 1, wherein the displayed image of said user controllable image is modified according to movements of said user controllable image.

32. The method of claim 1 further comprising the step of providing means to said at least one user to select biomechanical parameters of said series of images of demonstrative movements.

33. The method of claim 32, wherein said at least one user is a physically challenged user controlling movement of at least one part of the virtual body of said user controllable image without moving a corresponding part of said physically challenged user's body.

34. The method of claim 1, wherein said at least one user controls at least one part of the virtual body of said at least one user controllable image without moving a corresponding part of the user's body.

35. The method of claim 1, wherein said series of images of demonstrative movements are displayed in the foreground of said user controllable image.

36. The method of claim 1, wherein said series of images of demonstrative movements are displayed in the background of said user controllable image.

37. The method of claim 1, wherein the process of said at least one user idiosyncratically interacting with said at least one image is communicated to at least one other remotely located user.

38. The method of claim 1, wherein said at least one displayed sequence of demonstrative images comprises a series of images of objects representing said demonstrative movements.

39. The method of claim 1, wherein said displayed sequence of demonstrative images is responded to by user input controls to said processing system such that said at least one user's idiosyncratic controls are displayed as simulated responses made by said at least one user in the first person.

40. The method of claim 1, wherein said demonstrative image is comprised of a physical device.

41. The method of claim 1, wherein said user controllable image is comprised of a physical device.

42. The method of claim 1, wherein said displayed sequence of demonstrative images is displayed on a holographic display.

43. The method of claim 1, wherein said displayed sequence of user controllable images is displayed on a holographic display.

44. The method of claim 1, wherein said demonstrative image is a member of a group comprised of at least one live image.

45. The method of claim 44, wherein two such said groups compete against one another.

46. The method of claim 1, wherein said user controllable image is a member of a group comprised of at least one live image.

47. The method of claim 46, wherein two such said groups compete against one another.

48. The method of claim 1, wherein prior user inputs to said processing system to control said user controllable image are stored in said memory means of said processing system.

49. The method of claim 48, wherein said stored inputs are selected by said user such that said user controllable image performs said movements as controlled by said stored memory inputs without further inputs from said user.

50. The method of claim 1, wherein at least one said user controllable image performs at least one said simulated movement that is independent of said at least one user's control.

51. The method of claim 1, wherein said demonstrative image uses a representation of a real item used in an activity representing said movements.

52. The method of claim 1, wherein said demonstrative image uses a representation of an unreal item used in an activity representing said movements.

53. The method of claim 1, wherein said user controllable image is displayed using a real item in an activity representing said movements.

54. The method of claim 1, wherein said user controllable image is displayed using an unreal item in an activity representing said movements.

55. The method of claim 1 further comprising the step of evaluating by processing system means of said processing system, said simulated movements of said user controllable image with said sequence of demonstrative images.

56. The method of claim 55 further comprising the step of generating a processing system performance analysis of the user controllable image based on the result of said evaluation by said processor means.

57. The method of claim 1, wherein the processing system provides tactile feedback to said at least one user.

58. The method of claim 1, wherein said user controllable image is controlled by said user to perform a demonstrative performance of said physical activity movements.

59. The method of claim 1, further comprising allowing said user to control said user controllable image by voice inputs.

60. The method of claim 1, wherein said at least one of the demonstrative images and said at least one of the user controllable images are displayed in the same aspect.

61. The method of claim 1, wherein the characteristic parameters of said at least one of said demonstrative images are selected by said user.

62. The method of claim 1, wherein the characteristic parameters of said at least one of said user controllable images are selected by said user.

63. An article of manufacture comprising a processing system user medium having processor readable information embodied therein which evaluates a processing system displayed series of image sequences with a processing system displayed series of user idiosyncratically controlled image sequences comprising;

means for generating a first sequence of processing system displayed images, said sequence comprising a series of discrete movements of at least one image as displayed by said processing system readable information;

means for receiving said processing system controlled sequences, said sequences representing the processing system user's response to said processing system displayed first sequence; and means for evaluating said first and second sequences, and wherein said evaluation produces a result, said result providing an indication of the processing system user's demonstrated skill at responding to said first sequence.

64. A processing system for simulated training for at least one user interacting with said processing system comprising:

a first memory means for storing at least one processing system displayed sequence of demonstrative images in a series, wherein said series of at least one of said processing system displayed sequence of demonstrative images comprises a series of pre-recorded images illustrating performance of physical activity movements;

a second memory means for storing at least one processing system displayed user controllable image in a series, wherein said series of at least one computer displayed user controllable image comprises images derived from biomechanical parameters and controlled by at least one user to perform a series of idiosyncratic simulated physical activity movements responsive to the movements of said series of idiosyncratic images of demonstrative performance of the activity;

display means for displaying said series of images of demonstrative performance of the activity with said series of user controllable images;

input means, used by said at least one user, for transmitting input to said processing system to cause a series of user controllable images to perform a series of idiosyncratically controlled, simulated physical activity movements interactive with said movement of said series of images of demonstrative performance of the activity, without said user making corresponding movements, wherein said input comprises data controlling said movement of said user controllable image; and processing system means for storing said input from said at least one user in a third memory means; said processing system means for controlling said display means to display said series of images of demonstrative performance of the activity and said series of user controllable images, for retrieving said stored input from said third memory means, for providing said at least one user with means to evaluate said movement of said series of user controllable images with said movement of said series of images of demonstrative performance of the activity, and for displaying the results of said data related to controlled movement of said user controllable image.

65. The processing system of claim 64, wherein said input means comprises a virtual reality input device.

66. The processing system of claim 64, wherein said display means comprises a virtual reality display device.

67. The processing system of claim 64, wherein said series of at least one user controllable image performs at least one simulated physical activity movement that is independent of the said user's control.

68. A method of simulated training for at least one user to interact with at least one image displayed on a display means of a processing system, said method comprising the steps of:

recording and storing in a memory means of a processing system, a first series of discrete images, said discrete images collectively comprising a sequence of physical activity movements;

further recording and storing in a memory means a second series of discrete images collectively comprising a sequence of idiosyncratic simulated physical activity movements responsive to said first series of discrete images;

displaying, on a display means of said processing system, at least one of said discrete images in said first series, said displayed image comprising a first displayed image;

further displaying on said display means, at least one of said discrete images in said second series, said displayed image comprising a second displayed image;

sequentially displaying the next discrete images in said first series;

receiving input from at least one user to control said second displayed image to substantially interact with said first displayed image instead of said at least one user performing said interactive movements to said first series of discrete images displayed during said sequentially displaying step; and providing means for said at least one user to evaluate said second displayed images with said first displayed images, thereby said user being instructed to learn said movements interactive with said sequentially displayed discrete images in said first series.

69. The method of claim 68 further comprising the step of providing processing means of said processing system to evaluate said control of said second displayed images interacting with said first series of discrete images in order to provide the result of the evaluation to said at least one user.

70. The method of claim 68, wherein said processing system displayed series of image sequences of first discrete movements is comprised of images of live activity.

71. A processing system product usable with a programmable processor having processor readable information embodied therein which interactively obtains a sequence of processing system user input controls comprising:

processing system readable information which comprises at least a base set of displayable images;

processing system readable information which generates a sequence of various positions of one or more of said base set of displayable images;

processing system readable information which comprise at least one displayed template of said at least displayable image which enables image input controls by said processing system user, said image input controls representing a user's idiosyncratic interaction with said processing system information generated sequence;

wherein a user's demonstrated skill is determined based on an evaluation of said processing system user image input controls sequence to said processing system information generated sequence.

72. The processing system program information product of claim 71, wherein said base set of displayed images comprises live activity.

73. The processing system program information product of claim 71, wherein said product comprises capability for distributed operation.

74. A method of interactively determining a processing system user's demonstrated skill based on said user's interaction with one or more processing system displayed images, said method comprising;

providing a training sequence of discrete movements of at least one displayed image, said training sequence additionally comprising at least one of audible, alphanumeric and visual communication;

providing a processing system user with a displayed representation of said one or more displayed images;

accepting user input controls representing said processing system user's idiosyncratic interaction with said training sequence; and evaluating said user input controls to said training sequence, scoring said evaluation, said scoring representing said processing system user's demonstrated skill.

75. The method of claim 74, wherein a multimedia method of interactively determining a processing system user's demonstrated skill is based on said user's interacting with input controls in said training sequence.

76. A method of improving a processing system user's simulated training skills based on interaction with one or more processing system displayed images, said method comprising:

providing a training sequence of discrete movements of one or more displayed images, said training sequence representing at least one movement;

providing a processing system user with a displayed representation of said one or more displayed images;

accepting idiosyncratic user input controls representing said processing system user's response to said at least one movement;

evaluating said user input controls to said training sequence, scoring said evaluation, said scoring representing said processing system user's demonstrated skill in interacting with said at least one movement.

77. The method of claim 76 wherein improving a processing system user's simulated training skills comprises said at least one movement which represents at least one of a coaching and training decision.

78. A method of simulated training for a least one user using personal, interactive, idiosyncratic, physical movement to control at least one image displayed by a processing system, said method comprising the steps of:

generating and storing in a memory means of said processing system, at least one processor displayable sequence of demonstrative images, wherein said at least one processor displayable sequence of demonstrative images comprises a series of images of demonstrative performance of physical movements;

further generating, storing and maintaining in said memory means, at least one processor displayable user controllable image, wherein said at least one processor displayable user controllable image comprises a user idiosyncratically controllable image controlled by said user so as to perform a sequence of personal, interactive, idiosyncratic, simulated physical movements interacting with said sequence of demonstrative images;

displaying an image of said sequence of demonstrative images on a display means of said processing system;

further displaying said user controllable image on said display means of said processing system, providing said at least one user with input means of said processing system to transmit inputs to said processing system for controlling said user controllable image, such that instead of displaying the movement of said at least one user performing said movement, said user controllable image is controlled to perform said movements interactive with said displayed image of said sequence of demonstrative images;

storing and maintaining in said memory means, movements representing said user controllable image as controlled by said input means;

displaying said simulated physical movements of said user controllable image on said display means with said displayed image of said sequence of demonstrative images; and providing said at least one user with means to compare said movement of said user controllable image to said displayed image of said sequence of demonstrative images, thereby said user being instructed to learn said simulated movements interactive with said displayed image of said sequence of demonstrative images.

79. The method of claim 78, wherein said sequence of images of demonstrative performance of an activity is comprised of images of at least one of live images or videotaping images or animated or computer generated images of at least one of things, objects or systems.

80. The method of claim 78, wherein said at least one user controllable image is comprised of an image of said at least one of live images or videotaping images or animated or computer generated images of at least one of things, objects or systems.

81. The method of claim 78, wherein said user controllable image is idiosyncratically controlled by the user to perform a demonstrative performance of said movements.

82. The method of claim 78, further comprising allowing said user to control said user controllable image by voice inputs.

83. The method of claim 78, wherein said at least one of the demonstrative images and said at least one of the user controllable images are displayed in the same aspect.

84. The method of claim 78, wherein the characteristic parameters of said at least one of said demonstrative images are selected by the user.

85. The method of claim 78, wherein the characteristic parameters of said at least one of said user controllable images are selected by the user.

* * * * *